United States Patent
Hatanaka et al.

(10) Patent No.: US 7,873,755 B2
(45) Date of Patent: Jan. 18, 2011

(54) SEMICONDUCTOR DEVICE, REPRODUCTION DEVICE, AND METHOD FOR CONTROLLING THE SAME

(75) Inventors: Norio Hatanaka, Kyoto (JP); Hiroshi Satoh, Osaka (JP)

(73) Assignee: Panasonic Corporation, Osaka (JP)

( * ) Notice: Subject to any disclaimer, the term of this patent is extended or adjusted under 35 U.S.C. 154(b) by 344 days.

(21) Appl. No.: 12/027,303

(22) Filed: Feb. 7, 2008

(65) Prior Publication Data

US 2008/0209082 A1 Aug. 28, 2008

(30) Foreign Application Priority Data

Feb. 23, 2007 (JP) .............................. 2007-044333

(51) Int. Cl.
*G06F 3/00* (2006.01)
(52) U.S. Cl. ................... 710/15; 710/8; 710/17; 710/18; 710/19; 710/62
(58) Field of Classification Search ............. 710/8, 710/15, 17, 18, 19, 62
See application file for complete search history.

(56) References Cited

U.S. PATENT DOCUMENTS

| | | | |
|---|---|---|---|
| 6,898,652 B2 | 5/2005 | Peters et al. | |
| 7,149,834 B2 | 12/2006 | Peters et al. | |
| 7,302,614 B2 * | 11/2007 | Goto | 714/43 |
| 2002/0169915 A1 * | 11/2002 | Wu | 710/305 |
| 2004/0225836 A1 * | 11/2004 | Lin | 711/115 |
| 2005/0091564 A1 | 4/2005 | Oshita et al. | |
| 2005/0244803 A1 | 11/2005 | Brown et al. | |
| 2007/0115761 A1 * | 5/2007 | Song | 369/13.01 |
| 2008/0201764 A1 * | 8/2008 | Lu et al. | 726/2 |
| 2008/0250165 A1 * | 10/2008 | Reynolds et al. | 710/17 |
| 2010/0049884 A1 * | 2/2010 | Sharma et al. | 710/30 |

FOREIGN PATENT DOCUMENTS

JP 2005-519354 6/2005

* cited by examiner

*Primary Examiner*—Tariq Hafiz
*Assistant Examiner*—Jasjit S Vidwan
(74) *Attorney, Agent, or Firm*—Greenblum & Bernstein, P.L.C.

(57) ABSTRACT

A method for controlling a reproduction device which reproduces data held in a USB device connected to a USB terminal is provided. The method includes: detecting that the USB device is connected to the USB terminal; transmitting a call to the USB device, if the connection of the USB device is detected; detecting, during a first waiting time, a response from the USB device to the call transmitted to the USB device; detecting, during a second waiting time, different from the first waiting time, a response from the USB device to the call transmitted to the USB device, if the response from the USB device is not detected during the first waiting time; and reproducing the data held in the USB device, if the response from the USB device is detected during the first waiting time or during the second waiting time.

14 Claims, 9 Drawing Sheets

PRIOR ART

US 7,873,755 B2

SEMICONDUCTOR DEVICE, REPRODUCTION DEVICE, AND METHOD FOR CONTROLLING THE SAME

BACKGROUND OF THE INVENTION (1) Field of the Invention

The present invention relates to a semiconductor device, a reproduction device, and a method for controlling the same, and particularly to a method for controlling a reproduction device which reproduces data held in a USB device connected to a USB terminal.

(2) Description of the Related Art

Portable compact disc players and mini-disc players have been conventionally used as portable audio players. Recently, instead of the portable compact disc players and the mini-disc players, portable digital audio players have been on sale and accepted in the market, and their sales have been increasing. A portable digital audio player reproduces music data recorded in an internal flash memory or an external flash memory card.

The portable digital audio player includes a Universal Serial Bus (USB) terminal. The digital audio player obtains, via a USB, music data stored in a hard disk or the like of a personal computer or music data created on the personal computer. The portable digital audio player writes the obtained music data into the internal flash memory or the external flash memory card by using a USB device controller.

Generally speaking, a user often listens to music reproduced with a portable audio player, using a headphone connected to the portable audio player. On the other hand, there is an increasing demand for listening to music reproduced with the portable audio player in a room, a car, or the like where sound leakage to the surroundings does not matter, the music being outputted through a speaker of stationary audio equipment installed in the room or the car. As a result, it has been suggested that a USB used only as an interface between a personal computer and a peripheral device with a USB device function is used as an interface between the portable audio player and the stationary audio equipment. Furthermore, in response to such demand, stationary audio equipment, which is a reproduction device with a USB host function, is gradually put on sale.

A conventional reproduction device with a USB host function reads data from a storage medium with a USB device function that is connected to a USB connector (for example, a memory card and the like) or a reproduction device having a storing unit (for example, a portable digital audio player) and reproduces the read data.

In the case where a USB device is connected to the USB connector, a USB host generates a call signal and waits for a response from the USB device. The USB host determines whether or not the connected USB device includes the storing unit, based on the response from the USB device. Further, the USB host determines whether or not music data stored in the storing unit of the USB device can be reproduced and is accessed, based on the response from the USB device. In the case where the music data stored in the storing unit of the USB device can be reproduced, the USB host analyzes a file of internal record data in the storing unit, discerns a record composition, and allows read access to data to be reproduced.

The conventional reproduction device with the USB host function waits for a response from the USB device to a call generated by the USB host for a predetermined amount of time, and determines that the USB device cannot be reproduced in the case where there is no response within the predetermined amount of time (for example, refer to Japanese Unexamined Patent Application Laid-Open Publication No. 2005-519354).

Hereinafter, a conventional reproduction device is described with reference to FIG. 1.

FIG. 1 is a flow chart showing a flow of a reproduction processing for music data stored in a USB device by the conventional reproduction device.

Initially, the conventional reproduction device detects insertion of the USB device (S501). Secondary, the conventional reproduction device detects a corresponding speed of the inserted USB device (S502), and subsequently an access speed is determined according to the detected corresponding speed (S503). Next, the conventional reproduction device transmits a call command to the USB device (S504), and then waits for a response for a predetermined amount of time (S505). After a waiting time is over, the conventional reproduction device confirms whether or not there was the response from the USB device during the waiting time (S506).

In the case where there was the response (Yes in S506), the conventional reproduction device performs file analysis on the USB device, extracts files to be reproduced, based on the file analysis result, and determines a reproduction order (S507). Subsequently, the conventional reproduction device begins stream transmission of a start file of the files to be reproduced (S508), the reproduction order being assigned to the respective files, and begins to reproduce data on which the stream transmission is performed via a USB (S509).

On the other hand, in the case where there was no response in S506 (No in S506), the conventional reproduction device notifies a system controller or the like that the USB device cannot be reproduced (S510), the system controller or the like controlling an entire system, and ends a reproduction operation.

However, in the case where there is no response from the USB device to a call generated by a USB host within a predetermined amount of time, it is determined that such a USB device cannot be reproduced. As a result, the conventional reproduction device determines that even a reproducible USB device that gives a late response cannot be reproduced. In other words, an erroneous decision of whether or not the USB device can be reproduced occurs in the conventional reproduction device, depending on the response speed of the USB device.

Moreover, when the waiting time for response is set long in order to handle those that give late responses, it takes an additional time until the reproduction begins, the additional time being equivalent to the waiting time. Accordingly, this causes a problem that a time from when the USB device is connected till when the reproduction of the music data begins becomes longer, so that the waiting time for the user increases.

Consequently, the present invention has an object of providing a reproduction device and a method for controlling the reproduction device which prevent an erroneous decision of whether or not a USB device can be reproduced and suppress an increase in the waiting time until the reproduction begins.

SUMMARY OF THE INVENTION

For achieving the above object, the method for controlling according to the present invention is a method for controlling a reproduction device which reproduces data held in a USB device connected to a USB terminal, and which includes: a connection detecting step of detecting that the USB device is connected to the USB terminal; a call transmitting step of transmitting a call to the USB device, in the case where the connection of the USB device is detected; a first response detecting step of detecting, during the first waiting time, a response from the USB device to the call transmitted in the call transmitting step; a second response detecting step of detecting, during the second waiting time different from the first waiting time, the response from the USB device to the call transmitted in the call transmitting step, in the case where the response from the USB device is not detected in the first response detecting step; and a reproducing step of reproducing the data held in the USB device, in the case where the response from the USB device is detected in the first response detecting step or the second response detecting step.

According to this, in the case where there was no response from the USB device during the first waiting time, the reproduction device switches to the second waiting time and waits for a response again. As a result, even in the case where a corresponding speed of the USB device is slow and there is no response during the first waiting time, it is possible to obtain the response during the second waiting time. In other words, the method for controlling the reproduction device according to the present invention can prevent an erroneous decision of whether or not the USB device can be reproduced.

Furthermore, in the case where a response time of the USB device is short and there was the response during the first waiting time, a time until the reproduction begins is only the first waiting time. Consequently, the method for controlling the reproduction device can suppress an increase in the waiting time until the reproduction begins.

Moreover, it is possible that, in the first response detecting step, the response from the USB device to the call transmitted in the call transmitting step is detected at every predetermined time, during the first waiting time, and that, in the second response detecting step, the response from the USB device to the call transmitted in the call transmitting step is detected at every predetermined time, during the second waiting time.

According to this, in the case where there was the response from the USB device, the method for controlling the reproduction begins a processing of the data held in the USB device without waiting the first waiting time or the second waiting time to pass. As a result, the response time is reduced, so that the processing can be performed at high speed.

In addition, it is possible that the first response detecting step includes: a first count value obtaining step of obtaining a first count value held in a storing unit included in the reproduction device; and a first counting step of counting the first waiting time by counting the first count value obtained in the first count value obtaining step, and that the second response detecting step includes: a second count value obtaining step of obtaining a second count value held in the storing unit; and a second counting step of counting the second waiting time by counting the second count value obtained in the second count value obtaining step.

According to this, the first waiting time and the second waiting time can be counted by counting the first count value and the second count value stored in the storing unit.

Furthermore, the first waiting time is shorter than the second waiting time. The first response detecting step may include: a first count value obtaining step of obtaining a first count value held in a storing unit included in the reproduction device; and a first counting step of counting the first waiting time by counting the first count value obtained in the first count value obtaining step, and the second response detecting step may include: a second count value obtaining step of obtaining a second count value held in the storing unit; a third count value computing step of computing a third count value by adding the first count value obtained in the first count value obtaining step and the second count value obtained in the second count value obtaining step; and a second counting step of counting the second waiting time by counting the third count value computed in the third count value computing step.

According to this, the second count value is smaller compared with a case where the second count value is a count value corresponding to the second waiting time. That is, it is possible to reduce an amount of data of the second count value.

Moreover, the first response detecting step may include: a first count value obtaining step of obtaining a first count value held in a storing unit included in the reproduction device; and a first counting step of counting the first waiting time by counting the first count value obtained in the first count value obtaining step, and the second response detecting step may include: a second count value computing step of computing a second count value by adding the first count value obtained in the first count value obtaining step and the first count value; and a second counting step of counting the second waiting time by counting the second count value computed in the second count value computing step.

According to this, since only the first count value is stored in the storing unit, it is possible to reduce the amount of data compared with a case where the first count value and the second count value are stored in the storing unit.

Additionally, the method for controlling may include a third response detecting step of detecting, during a third waiting time, a response from the USB device to the call transmitted in the call transmitting step, in the case where the response from the USB device is not detected in the second response detecting step. In the reproducing step, the data held in the USB device is reproduced, in the case where the response from the USB device is detected in any of the first response detecting step, the second response detecting step, and the third response detecting step. The first response detecting step may include: a first count value obtaining step of obtaining a first count value held in a storing unit included in the reproduction device; and a first counting step of counting the first waiting time by counting the first count value obtained in the first count value obtaining step. The second response detecting step may include: a second count value obtaining step of obtaining a second count value held in the storing unit; a third count value computing step of computing a third count value by performing an arithmetic operation using the first count value obtained in the first count value obtaining step and the second count value obtained in the second count value obtaining step; and a second counting step of counting the second waiting time by counting the third count value computed in the third count value computing step. The third response detecting step may include: a fourth count value computing step of computing a fourth count value by performing the arithmetic operation using at least two among the first count value, the second count value, and the third count value, the first count value being obtained in the first count value obtaining step, the second count value being obtained in the second count value obtaining step, and the third count value being computed in the third count value computing step; and a third counting step of counting the third waiting time by counting the fourth count value computed in the fourth count value computing step.

According to this, since only the first count value and the second count value are stored in the storing unit, it is possible to reduce the amount of data compared with a case where the first count value, the second count value, and the third count value are stored.

Furthermore, the method for controlling may further include: a parameter obtaining step of obtaining a parameter which is set externally; a response-waiting determining step of determining whether or not the second response detecting step is to be performed according to the parameter obtained in the parameter obtaining step; and a first notifying step of notifying the outside that the data held in the USB device cannot be reproduced, in the case where the response from the USB device is not detected in the first response detecting step and it is determined in the response-waiting determining step that the second response detecting step is not to be performed. In the second response detecting step, the response from the USB device to the call transmitted in the call transmitting step may be detected during the second waiting time, in the case where the response from the USB device is not detected in the first response detecting step and it is determined in the response-waiting determining step that the second response detecting step is to be performed.

According to this, after the first waiting time ended, it is determined whether or not the second waiting time is to be applied, based on the parameter externally set in the response-waiting determining step. Consequently, it is possible to wait for the response from the USB device using an externally set waiting time. Therefore, the method for controlling the reproduction device according to the present invention allows setting of a waiting time in accordance with a status of use and so on.

Moreover, the method for controlling may further include: a first response time obtaining step of obtaining a largest value of response time of the USB device, the largest value being stored in a non-volatile storing unit included in the reproduction device; a response-waiting determining step of determining that the second response detecting step is to be performed in the case where the largest value obtained in the response time obtaining step is larger than a predetermined value, and that the second response detecting step is not to be performed in the case where the largest value obtained in the response time obtaining step is smaller than the predetermined value; a first notifying step of notifying the outside that the data held in the USB device cannot be reproduced, in the case where the response from the USB device is not detected in the first response detecting step and it is determined in the response-waiting determining step that the second response detecting step is not to be performed; a second response time obtaining step of obtaining a time at which the response from the USB device is received, in the case where the response from the USB device is detected in the first response detecting step or the second response detecting step; and an updating step of updating the largest value stored in the storing unit to the time obtained in the response time obtaining step, in the case where the time obtained in the second response time obtaining step is larger than the largest value obtained in the first response time obtaining step. In the second response detecting step, the response from the USB device to the call transmitted in the call transmitting step may be detected during the second waiting time, in the case where the response from the USB device is not detected in the first response detecting step and it is determined in the response-waiting determining step that the second response detecting step is to be performed.

According to this, it is determined in the response-waiting determining step whether or not the second waiting time is to be applied, based on the largest value of a response time of USB devices that have ever been connected. As a result, it is possible to set the waiting time in accordance with the status of use. Further, a learning function which handles the response time of the USB device can be made available by updating, at any time, the largest value of the response time of the USB devices that have ever been connected.

In addition, the method for controlling may further include: a reproduction determining step of determining whether or not the reproduction device can reproduce the data stored in the USB device; and a second notifying step of notifying the outside that the data held in the USB device cannot be reproduced, in the case where it is determined in the reproduction determining step that the data cannot be reproduced.

According to this, it is possible to determine whether or not the reproduction device can reproduce the data stored in the USB device.

Moreover, the semiconductor device according to the present invention is used in a reproduction device and reproduces data held in a USB device connected to a USB terminal included in the reproduction device. The semiconductor device includes: a connection detecting unit which detects that the USB device is connected to the USB terminal; a call transmitting unit which transmits a call to the USB device, in the case where the connection of the USB device is detected by the connection detecting unit; a response obtaining unit which obtains a response from the USB device to the call transmitted by the call transmitting unit; a counting unit which counts the first waiting time and the second waiting time which is different from the first waiting time; a first determining unit which determines whether or not the response obtaining unit obtains a response from the USB device during the first waiting time counted by the counting unit; a second determining unit which determines whether or not the response obtaining unit obtains a response from the USB device during the second waiting time counted by the counting unit, in the case where the first determining unit determines that the response obtaining unit does not obtained the response from the USB device; and a reproducing unit which reproduces the data held in the USB device, in the case where the first determining unit or the second determining unit determines that the response obtaining unit obtains the response from the USB device.

According to this configuration, in the case where there was no response from the USB device during the first waiting time, the semiconductor device according to the present invention switches to the second waiting time and waits for a response again. Consequently, even in the case where a response speed of the USB device is slow and there is no response during the first waiting time, it is possible to obtain the response during the second waiting time. In other words, the semiconductor device according to the present invention can prevent the erroneous decision of whether or not the USB device can be reproduced.

In addition, in the case where the response time of the USB device is short and there was the response during the first waiting time, the time until the reproduction begins is only the first waiting time. Accordingly, the semiconductor device according to the present invention can suppress the increase in the waiting time until the reproduction begins.

Furthermore, the first determining unit may determine that the response obtaining unit obtains the response from the USB device without waiting the first waiting time to pass, in the case where the response obtaining unit obtains the response from the USB device, and the second determining unit may determine that the response obtaining unit obtains the response from the USB device without waiting the second waiting time to pass, in the case where the response obtaining unit obtains the response from the USB device.

According to this configuration, the semiconductor device according to the present invention begins the processing of the data held in the USB device without waiting the first waiting time or the second waiting time to pass, in the case where there was the response from the USB device. As a result, the response time is reduced, so that the processing can be performed at high speed.

Moreover, the semiconductor device may further include a count value storing unit which stores a first count value and a second count value, and the counting unit may count the first waiting time by counting the first count value stored in the count value storing unit, and to count the second waiting time by counting the second count value stored in the count value storing unit.

According to this configuration, the semiconductor device according to the present invention can count the first waiting time and the second waiting time by counting the first count value and the second count value stored in the count value storing unit.

Additionally, the first waiting time is shorter than the second waiting time. The semiconductor device may further include: a count value storing unit which stores a first count value and a second count value; and a count value computing unit which computes a third count value by adding the first count value and the second count value stored in the count value storing unit. The counting unit may count the first waiting time by counting the first count value stored in the count value storing unit, and to count the second waiting time by counting the third count value computed by the count value storing unit.

According to this configuration, the second count value is smaller compared with a case where the second count value is the count value corresponding to the second waiting time. That is, it is possible to reduce the amount of data of the second count value, the second count value being to be held in the count value storing unit.

Furthermore, the semiconductor device may further include: a count value storing unit which stores a first count value; and a count value computing unit which computes a second count value by adding the first count value stored in the count value storing unit and the first count value. The counting unit may count the first waiting time by counting the first count value stored in the count value storing unit, and to count the second waiting time by counting the second count value computed by the count value storing unit.

According to this configuration, since only the first count value is stored in the count value storing unit, it is possible to reduce the amount of data compared with a case where the first count value and the second count value are stored in the count value storing unit.

Moreover, the counting unit may further count a third waiting time. The semiconductor device may further include a third determining unit which determines whether or not the response obtaining unit obtains the response from the USB device during the third waiting time counted by the counting unit, in the case where the second determining unit determines that the response obtaining unit does not obtain the response from the USB device. The reproducing unit may reproduce the data held in the USB device, in the case where any of the first determining unit, the second determining unit, and the third determining unit determines that the response obtaining unit obtains the response from the USB device. The semiconductor device may further include: a count value storing unit which stores a first count value and a second count value; and a count value computing unit which computes one or more third count values by performing an arithmetic operation using the first count value and the second count value stored in the count value storing unit. The counting unit may count the first waiting time, the second waiting time, and the third waiting time by counting any of the first count value stored in the count value storing unit, the second waiting time stored in the count value storing unit, and the one or more third count values computed by the count value computing unit.

According to this configuration, since only the first count value and the second count value are stored in the count value storing unit, it is possible to reduce the amount of data compared with a case where the first count value, the second count value, and the third count value are stored in the count value storing unit.

In addition, the semiconductor device may further include: a parameter obtaining unit which obtains a parameter which is set externally; a response-waiting determining unit which determines whether or not the response is to be waited for the second waiting time according to the parameter obtained in the parameter obtaining unit; and a notifying unit which notifies the outside that the data held in the USB device cannot be reproduced, in the case where the first determining unit determines that the response obtaining unit does not obtain the response from the USB device and the response-waiting determining unit determines that response-waiting is not to be performed. The second determining unit may determine whether or not the response obtaining unit obtains the response from the USB device during the second waiting time counted by the counting unit, in the case where the first determining unit determines that the response obtaining unit does not obtain the response from the USB device and the response-waiting determining unit determines that the response-waiting is to be performed.

According to this configuration, after the first waiting time ended, the semiconductor device according to the present invention determines whether or not the second waiting time is to be applied, based on the externally set parameter. Accordingly, it is possible to wait for the response from the USB device using the externally set waiting time. Therefore, the semiconductor device according to the present invention allows the setting of the waiting time in accordance with the status of use and so on.

Furthermore, the semiconductor device may further include: a non-volatile storing unit which stores a largest value of response time of the USB device; a response-waiting determining unit which determines that response-waiting is to be performed for the second waiting time in the case where the largest value stored in the storing unit is larger than a predetermined value, and that the response-waiting is not to be performed in the case where the largest value stored in the storing unit is smaller than the predetermined value; a notifying unit which notifies the outside that the data held in the USB device cannot be reproduced, in the case where the first determining unit determines that the response obtaining unit does not obtain the response from the USB device and the response-waiting determining unit determines that the response-waiting is not to be performed; a count value obtaining unit which obtains the count value of the counting unit when the response obtaining unit obtains the response from the USB device; and an updating unit which updates the largest value stored in the storing unit to the count value in the case where the count value obtained by the count value obtaining unit is larger than the largest value stored in the storing unit. The second determining unit may determine whether or not the response obtaining unit obtains the response from the USB device during the second waiting time counted by the counting unit, in the case where the first determining unit determines that the response obtaining unit does not obtain the response from the USB device and the response-waiting determining unit determines that the response-waiting is to be performed.

According to this configuration, the semiconductor device according to the present invention determines whether or not the second waiting time is to be applied, based on the largest value of the response time of the USB devices that have ever been connected to the reproduction device. As a result, it is possible to set the waiting time in accordance with the status of use. Further, the learning function which handles the response time of the USB device can be made available by updating, at any time, the largest value of the response time of the USB devices that have ever been connected.

Additionally, the semiconductor device may further include: a reproduction determining unit which determines whether or not the reproducing unit can reproduce the data held in the USB device; and a notifying unit which notifies the outside that the data held in the USB device cannot be reproduced, in the case where the reproduction determining unit determines that the data cannot be reproduced.

According to this configuration, the semiconductor device according to the present invention can determine whether or not the reproduction device can reproduce the data stored in the USB device.

Furthermore, the reproduction device according to the present invention includes a USB terminal and reproduces data held in a USB device connected to the USB terminal. The reproduction device includes: a connection detecting unit which detects that the USB device is connected to the USB terminal; a call transmitting unit which transmits a call to the USB device, in the case where the connection of the USB device is detected by the connection detecting unit; a response obtaining unit which obtains a response from the USB device to the call transmitted by the call transmitting unit; a counting unit which counts a first waiting time and a second waiting time which is different from the first waiting time; a first determining unit which determines whether or not the response obtaining unit obtains a response from the USB device during the first waiting time counted by the counting unit; a second determining unit which determines whether or not the response obtaining unit obtains a response from the USB device during the second waiting time counted by the counting unit, in the case where the first determining unit determines that the response obtaining unit does not obtain the response from the USB device; and a reproducing unit which reproduces the data held in the USB device, in the case where the first determining unit or the second determining unit determines that the response obtaining unit obtains the response from the USB device.

According to this configuration, in the case where there was no response from the USB device during the first waiting time, the reproduction device according to the present invention switches to the second waiting time and waits for a response again. Consequently, even in the case where the response speed of the USB device is slow and there is no response during the first waiting time, it is possible to obtain the response during the second waiting time. In other words, the reproduction device according to the present invention can prevent the erroneous decision of whether or not the USB device can be reproduced.

Moreover, in the case where the response time of the USB device is short and there was the response during the first waiting time, the waiting time until the reproduction begins is only the first waiting time. Accordingly, the reproduction device according to the present invention can suppress the increase in the waiting time until the reproduction begins.

It should be noted that the present invention can be realized not only as the above-mentioned semiconductor device, the reproduction device, and the method for controlling the reproduction device, but also as a program which causes a computer to execute characteristic steps included in the method for controlling the reproduction device. It goes without saying that such program can be distributed via record media, such as a CD-ROM and the like, and transmission media, such as the internet and the like.

As described above, the present invention can achieve the object of providing the reproduction device and the method for controlling the same which prevent the erroneous decision of whether or not the USB device can be reproduced and suppress the increase in the waiting time until the reproduction begins.

FURTHER INFORMATION ABOUT TECHNICAL BACKGROUND TO THIS APPLICATION

The disclosure of Japanese Patent Application No. 2007-044333 filed on Feb. 23, 2007 including specification, drawings and claims is incorporated herein by reference in its entirety.

BRIEF DESCRIPTION OF THE DRAWINGS

These and the other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENT(S)

Hereinafter, embodiments of a reproduction device according to the present invention are described in detail with reference to the drawings.

First Embodiment

In the case where there is no response from a USB device within the first waiting time, a reproduction device according to a first embodiment of the present invention switches to the second waiting time and waits for the response again. As a result, even in the case where a corresponding speed of the USB device is slow, it is possible to correctly determine whether or not the USB device can be reproduced.

First, a configuration of the reproduction device according to the first embodiment of the present invention is described.

Figure 1:
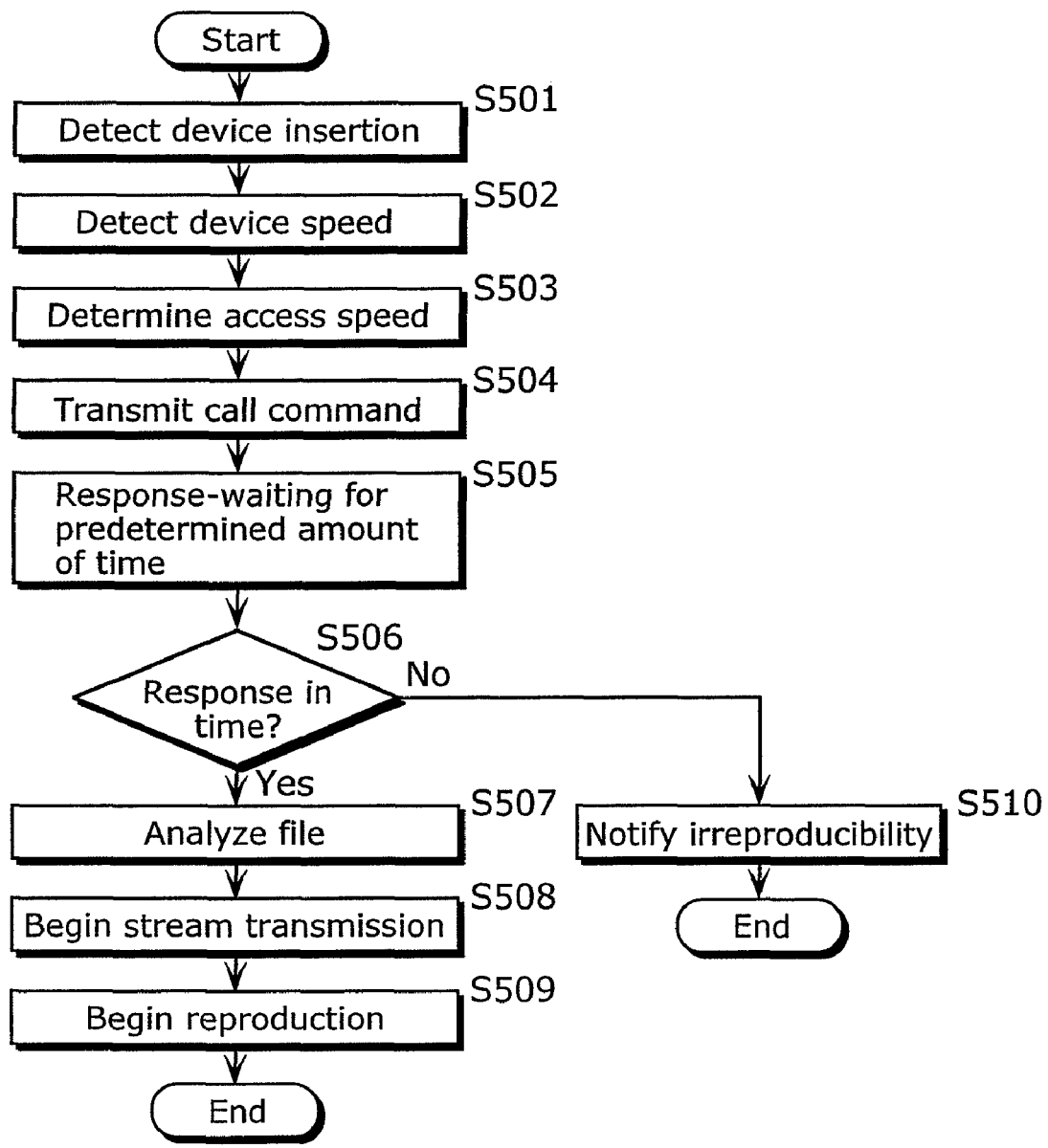
FIG. 1 is a flow chart showing a flow of a reproduction processing for data stored in a USB device by a conventional reproduction device.
Figure 2:
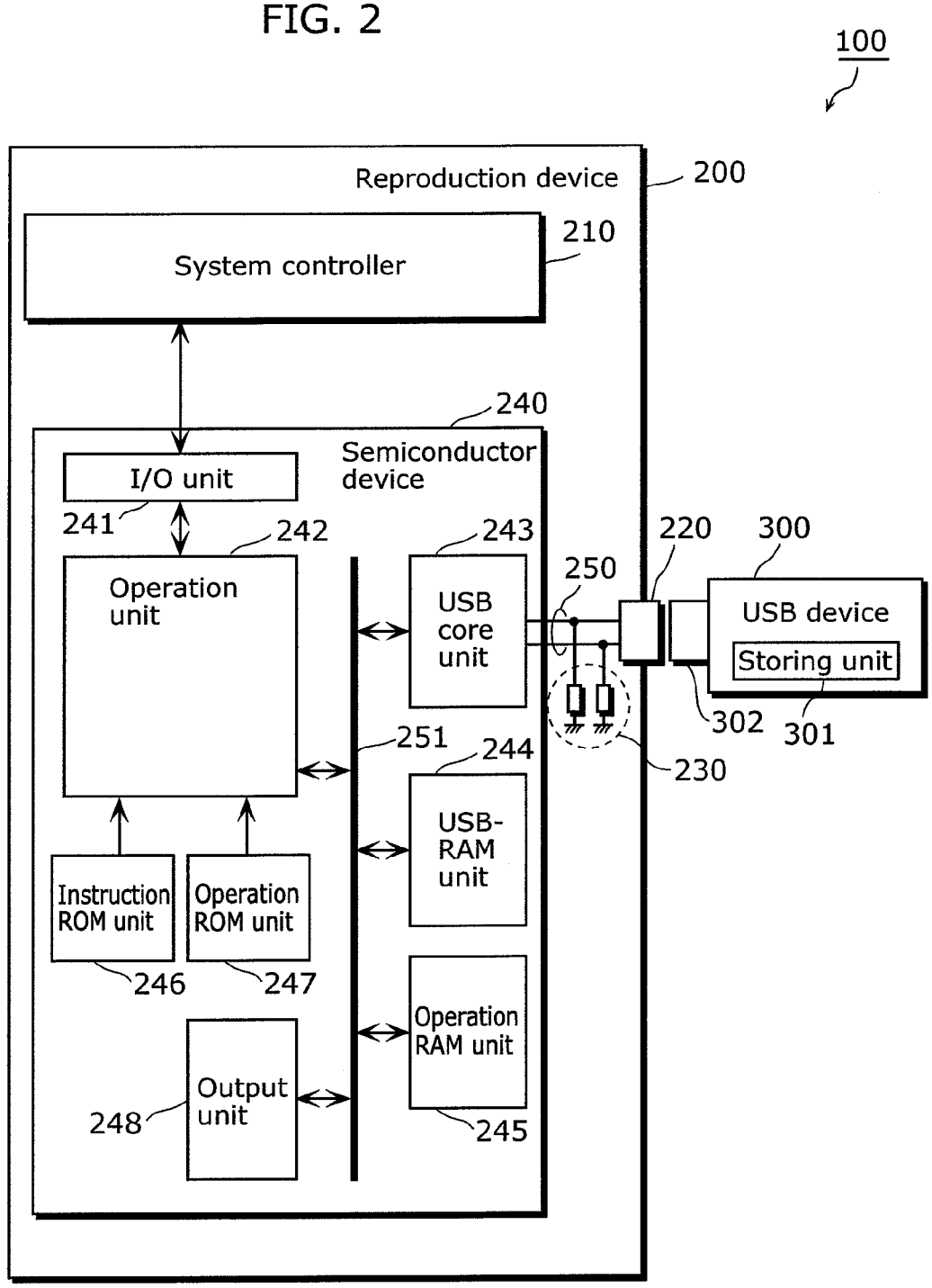
FIG. 2 is a view showing a configuration of a reproduction system according to a first embodiment of the present invention.

FIG. 2 is a view showing a configuration of a reproduction system according to the first embodiment of the present invention.

A reproduction system 100 shown by FIG. 2 includes a reproduction device 200 and a USB device 300.

The reproduction device 200 includes a system controller 210, a USB connector 220, pull-down resistors 230, and a semiconductor device 240.

The system controller 210 controls an entire system of the reproduction device 200.

The USB connector 220 is a USB terminal mounted on a board of the reproduction device 200.

The pull-down resistor 230 is mounted on the board of the reproduction device 200 and connected between two USB push-pull signals 250 and a GND of the board. The pull-down resistor 230 keeps the two USB push-pull signals 250 at a low level in an unloaded condition.

The semiconductor device 240 reads music data held in the USB device 300 connected to the USB connector 220 and is a 1-chip LSI which reproduces the read music data. In the case where the USB device 300 is connected to the USB connector 220, the semiconductor device 240 transmits a call command. The semiconductor device 240 includes: an I/O unit 241; an operation unit 242, a USB core unit 243; a USB-RAM unit 244, an operation RAM unit 245; an instruction ROM unit 246; an operation ROM unit 247; and an output unit 248. It should be noted that the semiconductor device 240 may be made up of plural LSIs.

The I/O unit 241 inputs and outputs a signal between the system controller 210 and the semiconductor device 240.

The operation unit 242 controls the semiconductor device 240 and performs a processing concerning detection of the USB device 300 and reproduction of the music data held in the USB device 300.

The USB core unit 243 functions as an interface between the USB push-pull signal 250 and an internal bus 251. The USB core unit 243 detects that the USB device 300 is inserted into the USB connector 220. Furthermore, the USB core unit 243 detects a corresponding speed of the inserted USB device 300.

The USB-RAM unit 244 is a RAM which temporarily stores input and output data for the USB core unit 243.

The operation RAM unit 245 is a RAM which temporarily stores operation data used by the operation unit 242 for carrying out an operation.

The instruction ROM unit 246 is a ROM which stores a control program (an instruction) used by the operation unit 242.

The operation ROM unit 247 is a ROM which stores data having a fixed value, the data being other than the instruction used by the operation unit 242. Specifically, the operation ROM unit 247 stores the first count value and the second count value used for determining the first waiting time and the second waiting time which are respectively the waiting time for a response from the USB device to a call command.

The output unit 248 outputs the music data processed by the operation unit 242 to a speaker and so on.

The USB device 300 is a storage medium having a USB device function (for example, a memory card and the like) or a reproduction device having a storing unit (for example, a portable digital audio player). The USB device 300 includes a storing unit 301 and a USB connector 302.

The storing unit 301 stores the music data and the like. The storing unit 301 is, for example, a hard disk or a non-volatile memory such as a flash memory and the like.

The USB connector 302 is connected to the USB connector 220 of the reproduction device 200.

Figure 3:
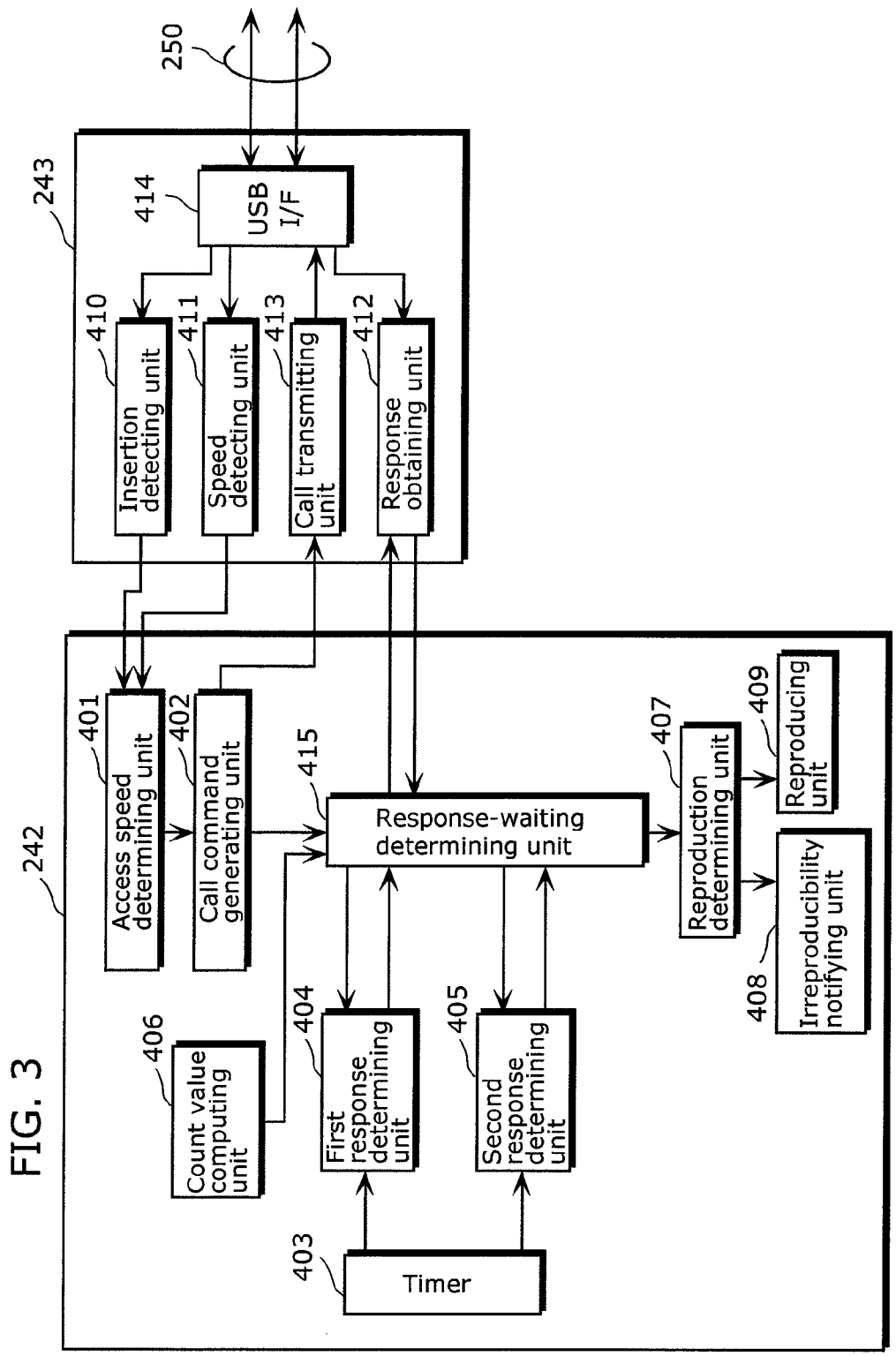
FIG. 3 is a block diagram showing a functional configuration of a reproduction device according to the first embodiment of the present invention.

FIG. 3 is a block diagram showing a functional configuration of the operation unit 242 and the USB core unit 243. For example, the operation unit 242 realizes functions shown by FIG. 3 by executing an instruction (a program) stored in the instruction ROM unit 246. Furthermore, the USB core unit 243 realizes the functions shown by FIG. 3 with a dedicated circuit (hardware). It should be noted that the dedicated circuit may execute a part or all of the functional blocks included in the operation unit 242. Moreover, the operation unit 242 executes the instruction stored in the instruction ROM unit 246, so that a part or all of the functional blocks included in the USB core unit 243 may be realized. In addition, the operation unit 242 may realize the functions shown by FIG. 3 by executing an instruction stored in a ROM, the non-volatile memory, the hard disk, or the like included in the reproduction device 200.

The operation unit 242 shown by FIG. 3 includes: an access speed determining unit 401; a call command generating unit 402; a timer 403; a first response determining unit 404; a second response determining unit 405; a count value computing unit 406; a reproduction determining unit 407; an irreproducibility notifying unit 408; a reproducing unit 409; and a response-waiting determining unit 415. The USB core unit 243 includes: an insertion detecting unit 410; a speed detecting unit 411; a response obtaining unit 412; a call transmitting unit 413; and a USB I/F 414.

The USB I/F 414 inputs and outputs a signal between the insertion detecting unit 410, the speed detecting unit 411, the response obtaining unit 412, and the call transmitting unit 413 respectively and the USB device 300.

The insertion detecting unit 410 detects that the USB device 300 is connected to the USB connector 220. Specifically, the insertion detecting unit 410 detects that the USB connector 302 of the USB device 300 is inserted by detecting that any one of the two USB push-pull signals 250 becomes a high level.

The speed detecting unit 411 detects a corresponding speed of the inserted USB device 300. Specifically, the speed detecting unit 411 detects the corresponding speed of the inserted USB device 300 by detecting which one of the two USB push-pull signals 250 becomes the high level.

The access speed determining unit 401 determines an access speed to the USB device 300, based on the corresponding speed of the USB device 300 detected by speed detecting unit 411.

In the case where the insertion detecting unit 410 detects connection of the USB device 300, the call command generating unit 402 transmits a call command indication to the call transmitting unit 413.

The call transmitting unit 413 transmits, through the USB I/F 414, a call command to the USB device 300 in accordance with the call command indication transmitted from the call command generating unit 402.

The response obtaining unit 412 obtains a response from the USB device 300 to the call command transmitted from the call command generating unit 402. The response obtaining unit 412 holds the obtained response in the USB-RAM unit 244.

The timer 403 counts the first waiting time and the second waiting time which is different from the first waiting time. The timer 403 counts the first waiting time by counting the first count value stored in the operation ROM unit 247. The timer 403 counts the second waiting time by counting the second count value stored in the operation ROM unit 247.

The response-waiting determining unit 415 confirms whether or not the response obtaining unit 412 obtained the response from the USB device 300. The response-waiting determining unit 415 transmits response information, which is the result of confirmation, to the first response determining unit 404 or the second response determining unit 405. Furthermore, the response-waiting determining unit 415 controls the first response determining unit 404, the second response determining unit 405, the count value computing unit 406, and the reproduction determining unit 407.

The first response determining unit 404 determines whether or not the response obtaining unit 412 obtained the response from the USB device 300 during the first waiting time counted by the timer 403. Specifically, the first response determining unit 404 determines whether or not the response obtaining unit 412 obtained the response from the USB device 300 during the first waiting time by verifying the response information transmitted from the response-waiting determining unit 415 after the first waiting time ended.

In the case where the first response determining unit 404 determined that the response obtaining unit 412 had not obtained the response from the USB device 300 during the first waiting time, the second response determining unit 405 determines whether or not the response obtaining unit 412 obtains the response from the USB device 300 during the second waiting time counted by the timer 403. Specifically, the second response determining unit 405 determines whether or not the response obtaining unit 412 obtained the response from the USB device 300 during the second waiting time by verifying the response information transmitted from the response-waiting determining unit 415 after the second waiting time ended.

The count value computing unit 406 computes a count value used by the timer 403 for counting the first waiting time and second waiting time by performing an arithmetic operation using the first count value and the second count value stored in the operation ROM unit 247. It should be noted that in the case where the timer 403 counts the first waiting time and the second waiting time by directly counting the first count value and the second count value stored in the operation ROM unit 247, the semiconductor device 240 may not necessarily include the count value computing unit 406.

The reproduction determining unit 407 determines whether or not the USB device 300 includes the storing unit 301. Further, the reproduction determining unit 407 determines whether or not the reproducing unit 409 can reproduce data held in the storing unit 301 of the USB device 300.

The irreproducibility notifying unit 408 notifies the system controller 210, through the I/O unit 241, that the data held in the storing unit 301 of the USB device 300 cannot be reproduced. In the case where there was no response from the USB device 300 during the first waiting time and the second waiting time, the irreproducibility notifying unit 408 notifies the system controller 210 that the data held in the storing unit 301 of the USB device 300 cannot be reproduced. That is, in the case where the second response determining unit 405 determines that the response obtaining unit 412 did not obtain the response from the USB device 300, the irreproducibility notifying unit 408 notifies the system controller 210 that the data held in the storing unit 301 of the USB device 300 cannot be reproduced. Moreover, in the case where the reproduction determining unit 407 determines that the data cannot be reproduced, the irreproducibility notifying unit 408 notifies the system controller 210, through the I/O unit 241, that the data held in the storing unit 301 of the USB device 300 cannot be reproduced.

In the case where the first response determining unit 404 determines that the response obtaining unit 412 obtained the response from the USB device 300 during the first response time, the reproducing unit 409 reproduces the data held in the USB device 300. In the case where the second response determining unit 405 determines that the response obtaining unit 412 obtained the response from the USB device 300 during the second response time, the reproducing unit 409 reproduces the data held in the USB device 300.

Next, an operation of the reproduction device 200 according to the first embodiment of the present invention is described.

Figure 4:
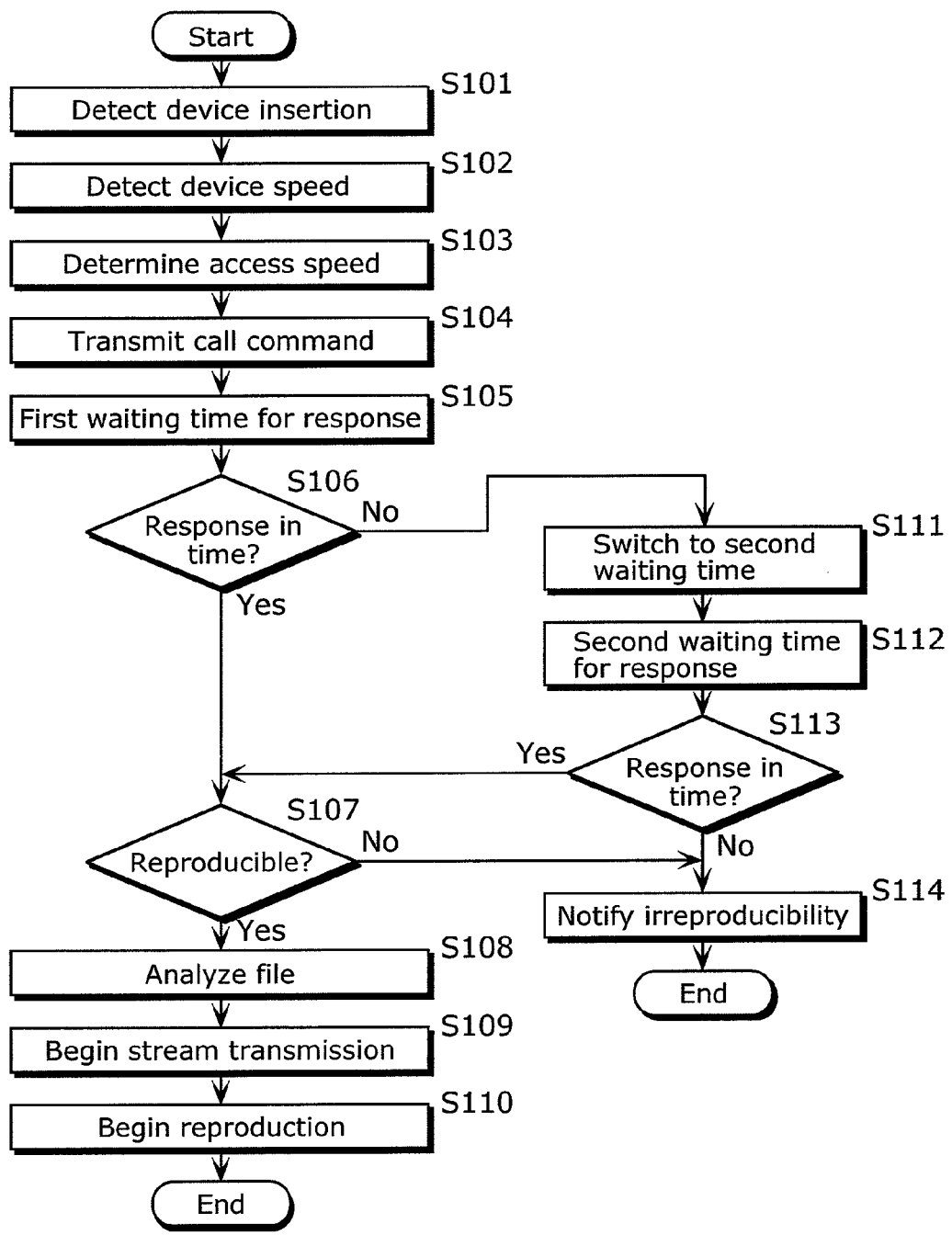
FIG. 4 is a flow chart showing a flow of a reproduction processing for the data stored in the USB device by the reproduction device according to the first embodiment of the present invention.

FIG. 4 is a flow chart showing a flow of reproduction processing for the music data stored in the USB device 300 by the reproduction device 200 according to the first embodiment of the present invention.

Initially, the insertion detecting unit 410 detects, through the USB I/F 414, that the USB device 300 is inserted into the USB connector 220 (S101). In the case where the USB connector 302 of the USB device 300 is inserted into the USB connector 220 of the reproduction device 200, any one of the two USB push-pull signals 250 becomes the high level. Accordingly, the insertion detecting unit 410 detects that the USB device 300 is inserted by detecting that any one of the two USB push-pull signals 250 becomes the high level. The insertion detecting unit 410 that detected the insertion of the USB device 300 transmits, through the internal bus 251, to the access speed determining unit 401, device insertion detection information which indicates that the USB device 300 is inserted.

Next, the speed detecting unit 411 detects the corresponding speed of the USB device 300 (S102). Based on the USB standard, a corresponding speed of a USB device is indicated depending on which one of two USB push-pull signals 250 becomes the high level. Consequently, the speed detecting unit 411 detects the corresponding speed of the inserted USB device 300 by detecting which one of the two USB push-pull signals 250 becomes the high level. The speed detecting unit 411 transmits, through the internal bus 251, to the access speed determining unit 401, device connection speed information which indicates the detected corresponding speed The access speed determining unit 401 of the operation unit 242 determines an access speed in accordance with the corresponding speed notified by the speed detecting unit 411 (S103). The reproduction device 200 accesses the USB device 300 at the access speed determined by the access speed determining unit 401 in S103 while being connected to the same device.

In the case where the insertion detecting unit 410 detects the connection of the USB device 300 in S101, the call command generating unit 402 transmits a call command to the USB device 300 (S104). Specifically, the call command generating unit 402 transmits the call command indication to the call transmitting unit 413. The call transmitting unit 413 that received the call command indication transmits, through the USB I/F 414, the call command to the USB device 300. Furthermore, the call command generating unit 402 transmits, to the response-waiting determining unit 415, call generation information, which is for notifying call generation.

Next, the first response determining unit 404 detects the response from the USB device 300 to the call command transmitted in S104 during the first waiting time. Specifically, the response-waiting determining unit 415 that received the call generation information reads the first count value stored in the operation ROM unit. The response-waiting determining unit 415 transmits the read first count value to the first response determining unit 404. As a result, the first response determining unit 404 obtains the first count value stored in the operation ROM unit 247. Moreover, the response-waiting determining unit 415 transmits a response-waiting determination indication to the first response determining unit 404. In other words, the response-waiting determining unit 415 directs the first response determining unit 404 to wait for a response for the read first waiting time for response.

The timer 403 counts the first waiting time by counting the first count value obtained by the first response determining unit 404. The first response determining unit 404 waits for the response while the timer 403 is counting the first waiting time (S105).

Specifically, the USB device 300 that received the call command gives the response back. The response obtaining unit 412 obtains, through the USB I/F 414, the response from the USB device 300. Here, a time from when the call transmitting unit 413 transmits the call command till when the response obtaining unit 412 obtains the response from the USB device 300 becomes a unique time to each USB device 300.

In addition, in the case where there was the response from the USB device 300 while waiting for the response, the response obtaining unit 412 holds the response from the USB device 300 in the USB-RAM unit 244. It should be noted that the response from the USB device 300 held in the USB-RAM unit 244 includes information on whether or not there was the response from the USB device 300 and information on the data stored in the storing unit 301 of the USB device 300.

On the other hand, the response-waiting determining unit 415 that received the call generation information from the call command generating unit 402 transmits a confirmation of response to the response obtaining unit 412. The response obtaining unit 412 that received the confirmation of response transmits the response information to the response-waiting determining unit 415. Here, the response information is information which indicates whether or not there was the response from the USB device 300. The response information indicates "response" in the case where there was the response from the USB device 300, and indicates "no response" in the case where there was no response.

The response-waiting determining unit 415 that received the response information transmits the received response information to the first response determining unit 404.

The first response determining unit 404 references the count value of the timer 403 after receiving the response-waiting determination indication and waits the first response time to pass. The first response determining unit 404 confirms whether or not there was the response from the USB device 300 during the first waiting time, based on the response information (S106). Furthermore, the first response determining unit 404 transmits, as the first response determination result, the presence or the absence of the response during the first waiting time for response to the response-waiting determining unit 415, based on the response information. Specifically, in the case where the response information which indicates "response" was received during the first waiting time, the first response determining unit 404 transmits the first response determination result which indicates "response", and in the case where the response information which indicates "response" was not received during the first waiting time, the first response determining unit 404 transmits the first response determination result which indicates "no response".

In the case where the first response determination result which indicates "response" was received, that is, in the case where there was the response (Yes in S106), the response-waiting determining unit 415 transmits a response-waiting determination result which indicates "response" to the reproduction determining unit 407.

The reproduction determining unit 407 that received the response-waiting determination result which indicates "response" determines whether or not the reproducing unit 409 can reproduce the data held in the USB device 300, based on a response content held in the USB-RAM unit 244 (S107). For example, the reproduction determining unit 407 determines whether or not the data can be reproduced by determining whether or not the USB device 300 includes the storing unit 301 or whether or not a transmission mode, a class, a file system, or the like of the USB device 300 is compatible with the specification of the reproduction device 200, based on the response content held in the USB-RAM unit 244.

In the case where the data can be reproduced (Yes in S107), the reproduction determining unit 407 transmits a reproduction indication to the reproducing unit 409. The reproducing unit 409 that received the reproduction indication analyzes files stored in the USB device 300, extracts files to be reproduced, based on the file analysis result, and determines a reproduction order (S108). Subsequently, the reproducing unit 409 begins stream transmission of a start file of the files to be reproduced, the reproduction order being assigned to the respective files (S109). The reproducing unit 409 reproduces the data on which the stream transmission is performed via a USB (s110).

On the other hand, in the case where the reproduction determining unit 407 determined that the data cannot be reproduced in S107 (No in S107), the reproduction determining unit 407 transmits an irreproducibility notification indication to the irreproducibility notifying unit 408. The irreproducibility notifying unit 408 that received the irreproducibility notification indication notifies the system controller 210, through the I/O unit 241, that the data held in the USB device 300 cannot be reproduced (S114), and ends the reproduction operation. For example, the system controller 210 that received the notification that the data cannot be reproduced makes a display device such as a LCD display that the data cannot be reproduced. As a result, that the data stored in the USB device 300 cannot be reproduced is notified to a user.

Moreover, in the case where the response from the USB device 300 was not detected in S106 (No in S106), the second response determining unit 405 detects the response from the USB device 300 to the call command transmitted in S104 during the second waiting time. Specifically, that is, in the case where the first response determination result is "no response" (No in S106), the response-waiting determining unit 415 reads the second count value stored in the operation ROM unit 247. The response-waiting determining unit 415 transmits the read second count value to the second response determining unit 405. Consequently, the second response determining unit 405 switches from the first waiting time to the second waiting time by obtaining the second count value stored in the operation ROM unit 247 (S111). Additionally, the response-waiting determining unit 415 transmits a response-waiting determination indication to the second response determining unit 405. In other words, the response-waiting determining unit 415 directs the second response determining unit 405 to wait for a response for the read second waiting time for response.

The timer 403 counts the second waiting time by counting the second count value obtained by the second response determining unit 405. The second response determining unit 405 waits for the response while the timer 403 is counting the second waiting time (S112). Here, the second waiting time may be longer or shorter than the first waiting time.

In the case where there was the response from the USB device 300 while waiting for the response during the second waiting time, the response obtaining unit 412 holds the response from the USB device 300 in the USB-RAM unit 244.

Furthermore, the response-waiting determining unit 415 transmits a confirmation of response to the response obtaining unit 412. The response obtaining unit 412 that received the confirmation of response transmits the response information to the response-waiting determining unit 415.

The response-waiting determining unit 415 that received the response information transmits the received response information to the second response determining unit 405.

The second response determining unit 405 references the count value of the timer 403 after receiving the response-waiting determination indication and waits the second response time to pass. The second response determining unit 405 confirms whether or not there was the response from the USB device 300 during the second waiting time, based on the response information (S113). Moreover, the second response determining unit 405 transmits, as the second response determination result, the presence or the absence of the response during the second waiting time for the response to the response-waiting determining unit 415, based on the response information. Specifically, in the case where the response information which indicates "response" was received during the second waiting time, the second response determining unit 405 transmits the second response determination result which indicates "response", and in the case where the response information which indicates "response" was not received during the second waiting time, the second response determining unit 405 transmits the second response determination result which indicates "no response".

In the case where the first response determination result which indicates "response" was received, that is, in the case where there was the response (Yes in S113), the response-waiting determining unit 415 transmits a response-waiting determination result which indicates "response" to the reproduction determining unit 415.

The reproduction determining unit 407 that received the response-waiting determination result which indicates "response" determines whether or not the reproducing unit 409 can reproduce the data held in the USB device 300, based on a response content held in the USB-RAM unit 244 (S107). It should be noted that subsequent processes are the same as the above-mentioned processes.

On the other hand, in the case where the response from the USB device 300 was not detected in S113 (No in S113), that is, in the case where both the first and second response determination results are "no response", the reproduction determining unit 407 transmits an irreproducibility notification indication to the irreproducibility notifying unit 408. The irreproducibility notifying unit 408 that received the irreproducibility notification indication notifies the system controller 210, through the I/O unit 241, that the data held in the USB device 300 cannot be reproduced (S114), and ends the reproduction operation.

As described above, in the case where there was no response from the USB device 300 during the first waiting time, the reproduction device 200 according to the first embodiment of the present invention switches to the second waiting time and waits for the response again. Accordingly, even in the case where the response speed of the USB device 300 is slow and there is no response during the first waiting time, it is possible to obtain the response during the second waiting time. In other words, the reproduction device 200 according to the first embodiment of the present invention can prevent an erroneous decision of whether or not the USB device can be reproduced.

In addition, in the case where the response time of the USB device 300 was short and there was the response during the first waiting time, the response is not to be waited for the second waiting time, so that a waiting time until the reproduction begins is only the first waiting time. Therefore, the reproduction device 200 according to the first embodiment of the present invention can suppress the increase in the waiting time until the reproduction begins.

Although the reproduction device according to the present embodiment of the present invention has been described so far, the present invention is not limited to the present embodiment.

For example, although the operation ROM unit 247 stores the first count value and the second count value corresponding to the first waiting time and the second waiting time respectively in the above description, in the case where the second waiting time is longer than the first waiting time, the operation ROM unit 247 may hold the first count value corresponding to the first waiting time and the second count value corresponding to a difference between the first waiting time and the second waiting time. In such case, the count value computing unit 406 adds the first count value and the second count value, and computes the third count value. The timer 403 counts the second waiting time by counting the third count value computed by the count value computing unit 406.

Furthermore, in the case where the second waiting time is shorter than the first waiting time, the operation ROM unit 247 may hold the first count value corresponding to a difference between the first waiting time and the second waiting time the second count value corresponding to the second waiting time. In such case, the count value computing unit 406 adds the first count value and the second count value, and computes the third count value. The timer 403 counts the first waiting time by counting the third count value computed by the count value computing unit 406. In this way, storing the count value corresponding to the difference between the first waiting time and the second waiting time in the operation ROM unit 247 allows a reduction in an amount of data when compared with a case where the count values corresponding to the first waiting time and the second waiting time respectively are stored.

Further, it is possible that the count value computing unit 406 computes the third count value by subtracting the first count value and the second count value and that the timer 406 counts the first waiting time or the second waiting time by counting the third value computed by count value computing unit 406.

Moreover, although the waiting times are the first waiting time and the second waiting time in the above description, it is possible to set three or more waiting times. The third waiting time may be set in the case where there is no response during the second waiting time, and the fourth waiting time may be set in the case where there is no response during the third waiting time.

Further, in the case where there are three or more waiting times, the operation ROM unit 247 may hold two or less count values, instead of holding count values corresponding to the three or more periods of the waiting time respectively. In such case, the count value computing unit 406 computes one or more third count values by performing the arithmetic operation using the first count value and the second count value stored in the operation ROM unit 247. The timer 403 may count the first waiting time, the second waiting time, the third waiting time, and the subsequent waiting time by counting any of the first count value stored in the operation ROM unit 247, the second count value stored in the operation ROM unit 247, and the ore or more third count values computed by the count value computing unit 406. For example, it is possible that the operation ROM unit 247 holds the first count value and the second count value, and that the count value computing unit 406 computes respective count values corresponding to waiting time subsequent to the second waiting time respectively by sequentially adding the second count values to the first count value.

Further, the operation ROM unit 247 may include only the first count value. In such case, the count value computing unit 406 adds the first count value and the first count value, and computes the second count value. Further, the first count values are sequentially added to the second count value, so that count values subsequent to the third count value are computed. The timer 403 counts the first waiting time by counting the first count value, and counts the waiting time subsequent to the second waiting time by counting the count values subsequent to the second count value computed by the count value computing unit 406. In this way, computing by the count value computing unit 406 allows the reduction in the amount of data held in the operation ROM unit 247.

Furthermore, although the first count value and the second count value are held in the operation ROM unit 247 in the above description, they may be stored in the ROM, the non-volatile memory, the hard disk, or the like included in the reproduction device 200.

Additionally, although the example where the music data held in the USB device 300 is reproduced in the above description, the present invention may be applied to when reproducing still picture data, moving picture data, and audio-visual data.

Second Embodiment

In the case where there was a response from a USB device during a waiting time for response, the reproduction device 200 according to a second embodiment of the present invention begins a reproduction processing of data stored in the USB device before the end of the waiting time for response. As a result, a response time is reduced, so that the processing can be performed at high speed.

It should be noted that a configuration of the reproduction device 200 according to the second embodiment of the present invention is the same as FIG. 2 and FIG. 3, and is not described.

Hereinafter, an operation of the reproduction device 200 according to the second embodiment of the present invention is described.

Figure 5:
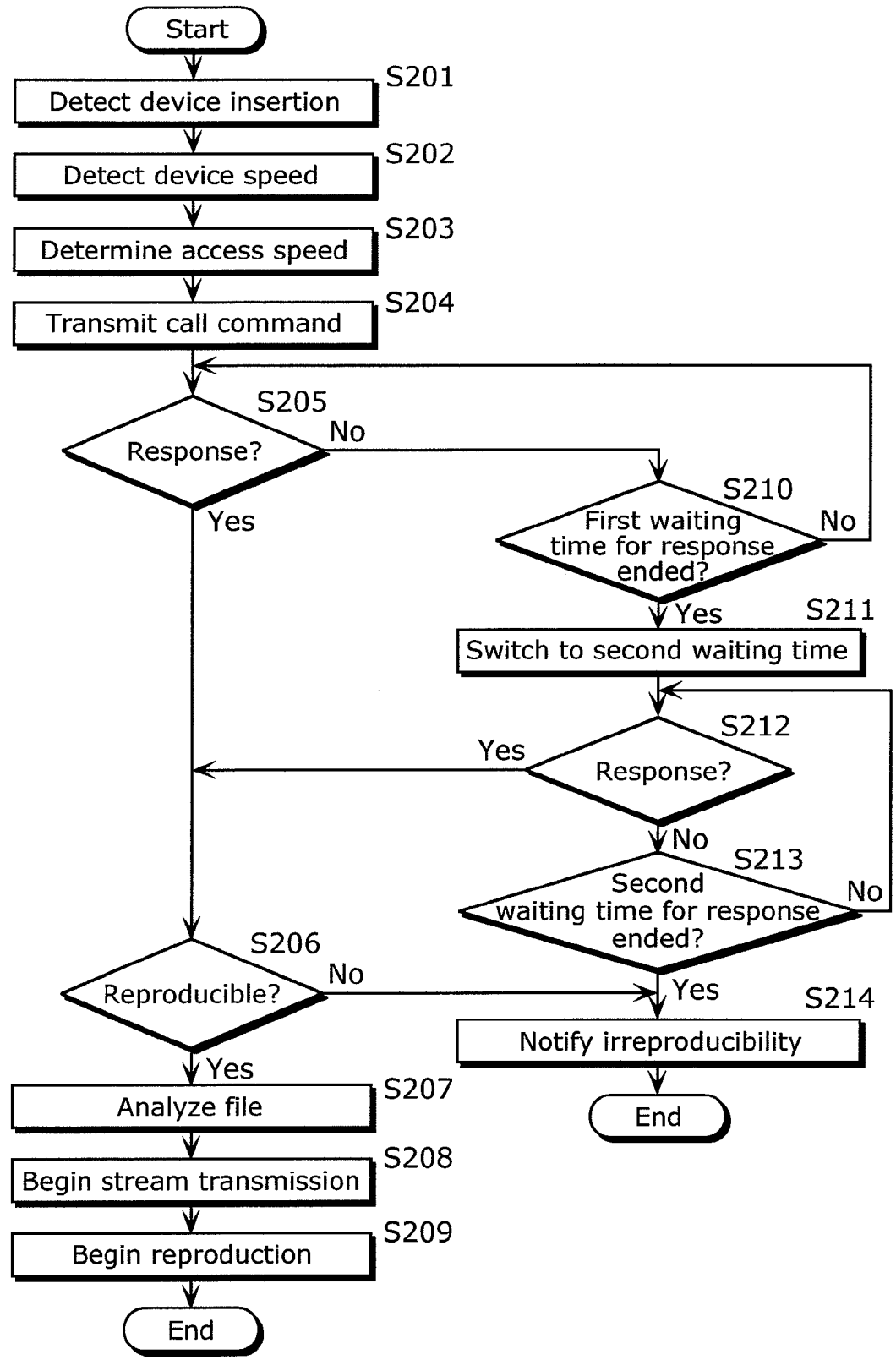
FIG. 5 is a flow chart showing a flow of a reproduction processing for data stored in a USB device by a reproduction device according to a second embodiment of the present invention.

FIG. 5 is a flow chart showing a flow of reproduction processing for music data stored in the USB device 300 by the reproduction device 200 according to the second embodiment of the present invention. The flow of the reproduction processing shown by FIG. 5 is the partially modified flow of the reproduction processing of the above mentioned first embodiment. The same elements of the flows are not described, and only different elements of the flows are described.

Processes S201 to S204 shown by FIG. 5 are the same as S101 to S104 shown by FIG. 4, and are not described.

In the reproduction device 200 according to the second embodiment of the present invention, in the case where the response obtaining unit 412 obtains a response from the USB device 300, the first response determining unit 404 determines that the response obtaining unit 412 obtained the response from the USB device 300 without waiting for the first waiting time to pass. In the case where the response obtaining unit 412 obtained the response from the USB device 300, the second response determining unit 405 determines that the response obtaining unit 412 obtained the response from the USB device 300 without waiting the second waiting time to pass.

Specifically, after the call command generating unit 402 transmits a call command in S204, the timer 403 begins to count the first waiting time. In the case where there was the response from the USB device 300 during the first waiting time, the response obtaining unit 412 holds the response from the USB device 300 in the USB-RAM unit 244. The response-waiting determining unit 415 transmits a confirmation of response to the response obtaining unit 412 for every predetermined amount of time. The response obtaining unit 412 that received the confirmation of response transmits response information to the response-waiting determining unit 415. The response-waiting determining unit 415 that received the response information transmits the received response information to the first response determining unit 404. The first response determining unit 404 confirms whether or not there was the response from the USB device 300 during the first waiting time by confirming the response information transmitted from the response-waiting determining unit 415 (S205).

In the case where there is no response (No in S205), the first response determining unit 404 confirms whether the first waiting time has passed (S210). In the case where the first waiting time has not passed (No in S210), the first response determining unit 404 confirms whether there was the response from the USB device 300 again after the predetermined amount of time passed (S205). In other words, the first response determining unit 404 detects the response from the USB device 300 for the every predetermined amount of time until the first waiting time passes.

When the first waiting time passes (Yes in S210), the second response determining unit 405 switches from the first waiting time to the second waiting time by obtaining the second count value stored in the operation ROM unit 247 (S211). The timer 403 begins to count the second waiting time.

In the case where there was the response from the USB device 300 during the second waiting time, the response obtaining unit 412 holds the response from the USB device 300 in the USB-RAM unit 244. The response-waiting determining unit 415 transmits a confirmation of response to the response obtaining unit 412 for an every predetermined amount of time. The response obtaining unit 412 that received the confirmation of response transmits response information to the response-waiting determining unit 415. The response-waiting determining unit 415 that received the response information transmits the received response information to the second response determining unit 405. The second response determining unit 405 confirms whether or not there was the response from the USB device 300 during the second waiting time by confirming the response information transmitted from the response-waiting determining unit 415 (S212).

In the case where there is no response (No in S212), the second response determining unit 405 confirms whether the second waiting time has passed (S213). In the case where the second waiting time has not passed (No in S213), the second response determining unit 405 confirms whether there was the response from the USB device 300 again after the predetermined amount of time passed (S212). That is, the second response determining unit 405 detects the response from the USB device 300 for the every predetermined amount of time until the second waiting time passes.

In the case where there was the response from the USB device 300 in S205 (Yes in S205), the first response determining unit 404 transmits a response-waiting determination indication which indicates "response" to the response-waiting determining unit 415 without waiting the first waiting time to pass. The response-waiting determining unit 415 transmits a response-waiting determination result which indicates "response" to the reproduction determining unit 407 without waiting the first waiting time to pass.

Furthermore, in the case where there was the response from the USB device 300 in S212 (Yes in S212), the second response determining unit 405 transmits a response-waiting determination indication which indicates "response" to the response-waiting determining unit 415 without waiting the second waiting time to pass. The response-waiting determining unit 415 transmits a response-waiting determination result which indicates "response" to the reproduction determining unit 407 without waiting the second waiting time to pass.

The reproduction determining unit 407 that received the response-waiting determination result which indicates "response" determines whether or not the data held in the USB device 300 can be reproduced, based on a response content held in the USB-RAM unit 244 (S206). It should be noted that processes subsequent to S206 are the same as the processes subsequent to S107 shown by FIG. 4, and are not described.

On the other hand, in the case where the second waiting time passed in S213 (Yes in S213), the irreproducibility notifying unit 408 notifies the system controller 210, through the I/O unit 241, that the data held in the USB device 300 cannot be reproduced (S214), and ends a reproduction operation.

As described above, in the case where there was the response from the USB device 300, the reproduction device 200 according to the second embodiment of the present invention begins the reproduction processing of the data held in the USB device 300 without waiting the first waiting time or the second waiting time to pass. Consequently, the response time is reduced, so that the processing can be performed at high speed.

Third Embodiment

A reproduction device according to a third embodiment of the present invention determines whether or not it waits for a response from a USB device for the second waiting time, based on an indication parameter set externally. Accordingly, it is possible to set a waiting time according to a status of use and so on.

First, a configuration of the reproduction device according to the third embodiment of the present invention is described.

A configuration of the reproduction device 100 according to the third embodiment of the present invention is the same as FIG. 2, and is not described.

Figure 6:
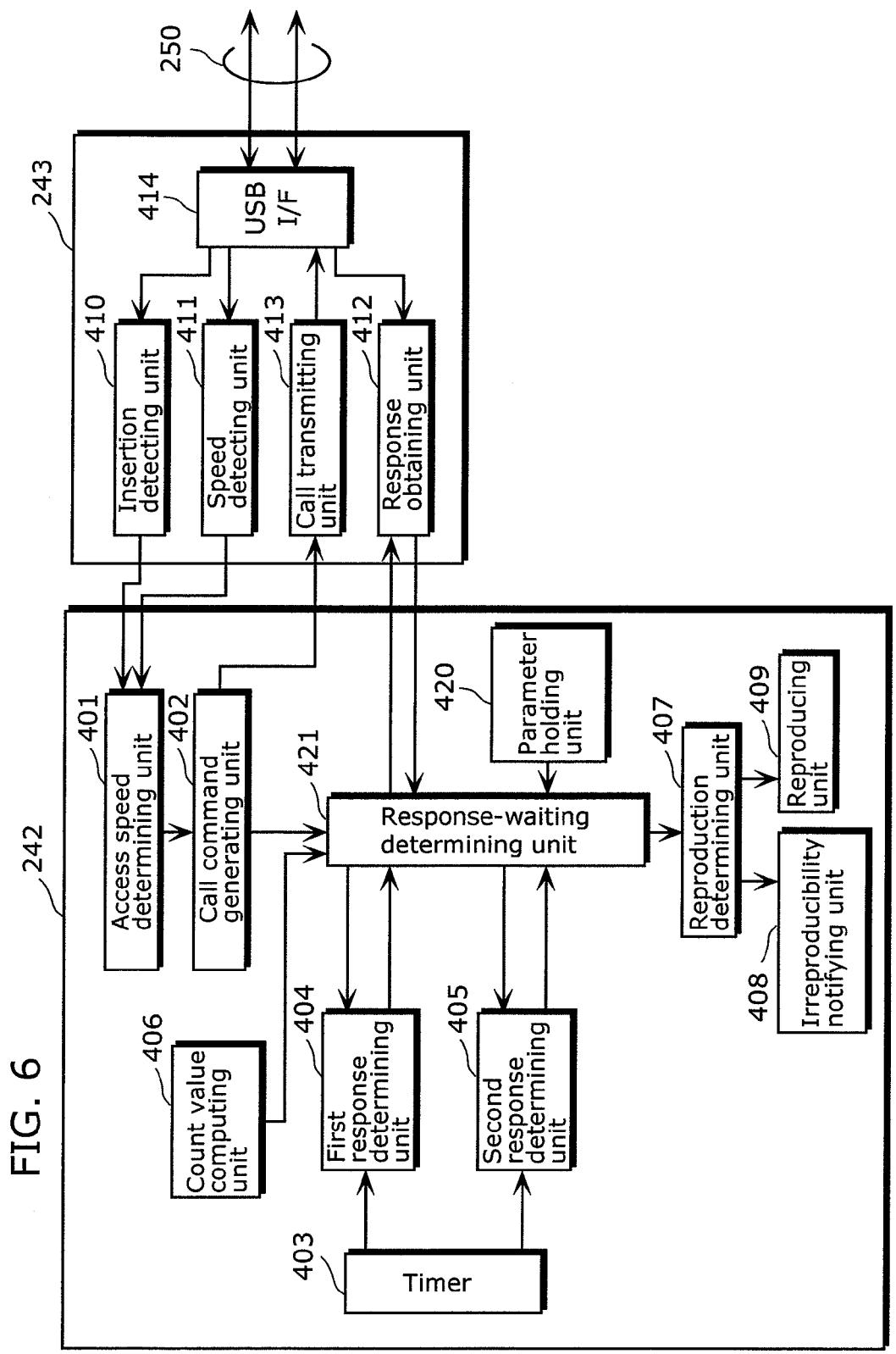
FIG. 6 is a block diagram showing a functional configuration of a reproduction device according to a third embodiment of the present invention.

FIG. 6 is a block diagram showing a functional configuration of the operation unit 242 and the USB core unit 243 according to the third embodiment of the present invention. It should be noted that the same numerals are given to components which are the same as those in FIG. 3, and the components are not described in detail.

The operation unit 242 shown by FIG. 6 further includes a parameter holding unit 420 in addition to the configuration of the operation unit 242 shown by FIG. 3. Moreover, a function of a response-waiting determining unit 421 differs.

The parameter holding unit 420 holds an indication parameter for determining whether or not a response is to be waited for the second waiting time. For example, the indication parameter is set by the system controller 210 and held in the parameter holding unit 420. It should be noted that the indication parameter may be held in the operation RAM unit 245.

In addition to a function of the response-waiting determining unit 415, the response-waiting determining unit 421 determines whether or not the response is to be waited for the second waiting time in accordance with the indication parameter held in the parameter holding unit 420.

Furthermore, in the case where the response-waiting determining unit 421 determined that the response would not be waited for the second waiting time, the second response determining unit 405 does not wait for the response for the second waiting time. In other words, in the case where the first response determining unit 404 determined that the response obtaining unit 412 had not obtained the response from the USB device 300 and the response-waiting determining unit 421 determined that the response would be waited, the second response determining unit 405 determines whether or not the response obtaining unit 412 obtained the response from the USB device 300 during the second waiting time counted by the timer 403.

Moreover, in the case where the first response determining unit 404 determined that the response obtaining unit 412 had not obtained the response from the USB device 300 and the response-waiting determining unit 421 determined that the response would not be waited, the irreproducibility notifying unit 408 notifies the system controller 210 that the data held in the USB device 300 cannot be reproduced.

Next, an operation of the reproduction device 200 according to the third embodiment of the present invention is described.

Figure 7:
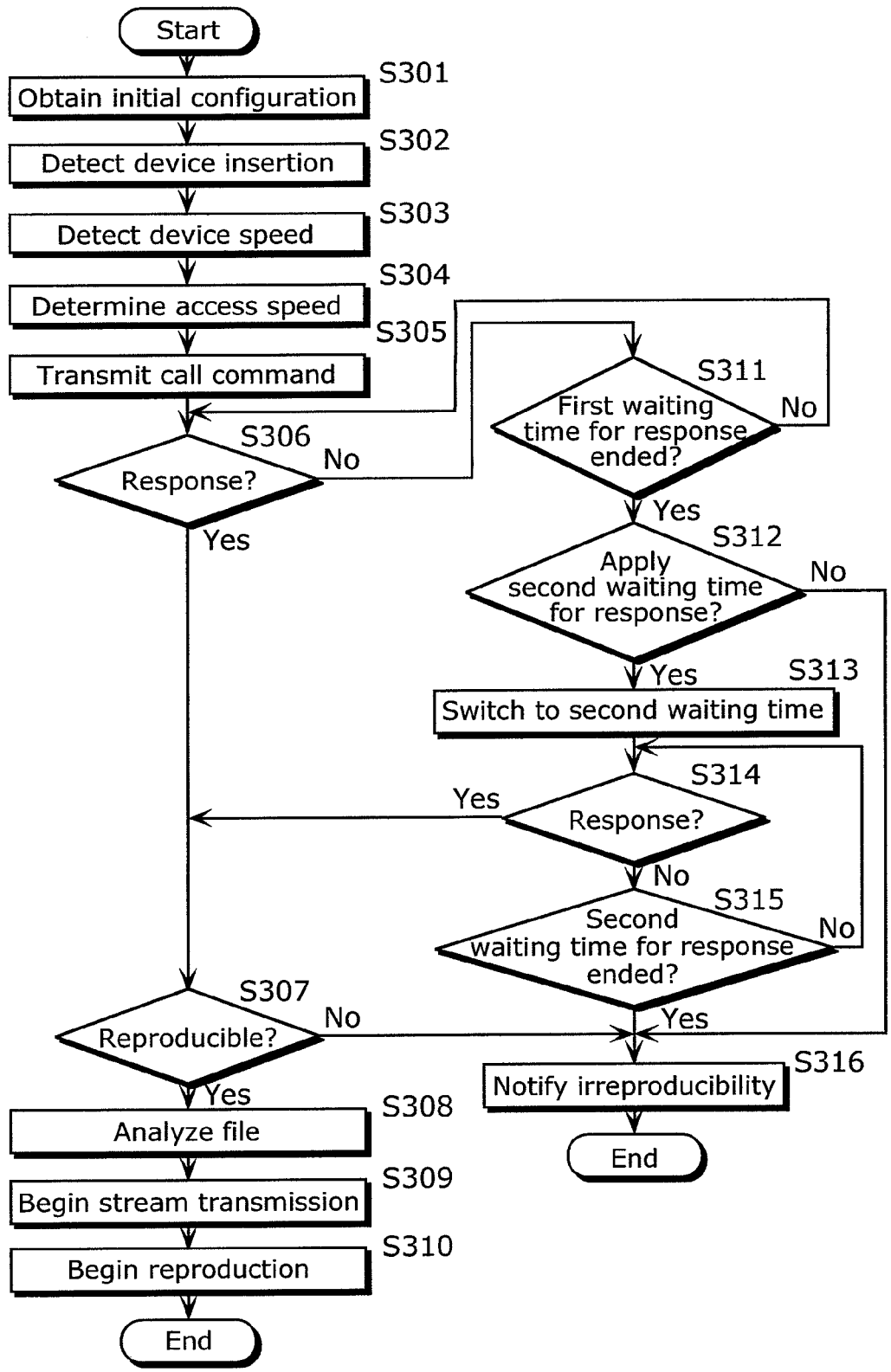
FIG. 7 is a flow chart showing a flow of a reproduction processing for data stored in a USB device by the reproduction device according to the third embodiment of the present invention.

FIG. 7 is a flow chart showing a flow of reproduction processing for music data stored in the USB device 300 by the reproduction device 200 according to the third embodiment of the present invention. The flow of the reproduction processing shown by FIG. 7 is the partially modified flow of the reproduction processing of the above mentioned second embodiment. The same elements of the flows are not described, and only different elements of the flows are described.

Compared with the flow of the reproduction processing shown by FIG. 5, an initial value configuration obtaining process (S301) and a second waiting time for response application determining process (S312) are added to the flow of the reproduction processing shown by FIG. 7.

As shown by the FIG. 7, the response-waiting determining unit 421 initially obtains the indication parameter held in the parameter holding unit 420, the indication parameter being set externally (S301). The response-waiting determining unit 421 confirms what are used for each value of the waiting times, based on the indication parameter and determines whether the first waiting time or the second waiting time is to be applied.

Processes S302 to S306 shown by FIG. 7 are the same as the processes S201 to S205 shown by FIG. 5, and are not described. Furthermore, processes subsequent to Yes in S306 shown by FIG. 7 are the same as the processes subsequent to Yes in S205 shown by FIG. 5. Moreover, a process up to S311 in the case of No in S306 is the same as the process up to S210 in the case of No in S205 shown by FIG. 5.

In the case where the first response time passed in S311 (Yes in S311), the response-waiting determining unit 421 determines whether or not the response is to be waited for the second waiting time in accordance with the indication parameter obtained in S301 (S312). In the case where the response-waiting determining unit 421 determined that the response would be waited for the second waiting time (Yes in S312), the second response determining unit 405 switches from the first waiting time to the second waiting time by obtaining the second count value stored in the operation ROM unit 247 (S313). It should be noted that processes subsequent to S313 are the same as the processes subsequent to S211 shown by FIG. 5, and are not described.

Additionally, in the case where it was determined that the response would not be waited for the second waiting time (No in S312), the irreproducibility notifying unit 408 notifies the system controller 210, through the I/O unit 241, that the data held in the USB device 300 cannot be reproduced (S316), and ends the reproduction operation.

As described above, the reproduction device 200 according to the third embodiment of the present invention determines whether or not the second waiting time is to be applied, based on the indication parameter externally set in S312 after the first waiting time ended. Accordingly, the response from the USB device 300 can be waited using externally set waiting time. Therefore, the reproduction device 200 according to the third embodiment of the present invention can set the waiting time according to the status of use and so on.

It should be noted that although there are two kinds of the waiting time, namely the first waiting time and the second waiting time, in the above description, there may be three or more kinds of the waiting time. In the case where there are three or more kinds of the waiting time, an indication parameter that indicates which one of three or more kinds of the waiting time is to be applied is obtained in S301. Furthermore, after the second waiting time passed (Yes in S315), whether or not the third waiting time is to be applied is confirmed. It should be noted that processes subsequent to a third waiting time application determining process are the same as the processes subsequent to the second waiting time application determining process (S312).

Moreover, although the reproduction device 200 obtains the initial configuration (S301) before detecting the device insertion (S302) in the above description, the initial configuration may be obtained at a predetermined timing (S301) in prior to determining whether or not the second waiting time is to be applied (S312). In addition, the response-waiting determining unit 421 may determine whether or not the second waiting time is to be applied (S312) at the predetermined timing after obtaining the initial configuration (S301), and whether or not the second waiting time is to be applied may be determined by confirming the result of determination by the response-waiting determining unit 421 after the first waiting time ended (Yes in S311).

Fourth Embodiment

The reproduction device 200 according to a fourth embodiment of the present invention holds the largest value of a response time of a connected USB device and determines whether or not a response is to be waited for the second waiting time, based on the largest value of the held response time. Accordingly, it is possible to set a waiting time according to a status of use and so on. Furthermore, a learning function which handles the response time of the USB device can be made available by updating, at any time, the largest value of the response time of USB devices that have ever been connected.

First, a configuration of a reproduction device according to the fourth embodiment of the present invention is described.

It should be noted that the configuration of the reproduction device according to the fourth embodiment of the present invention is the same as FIG. 2, and is not described.

Figure 8:
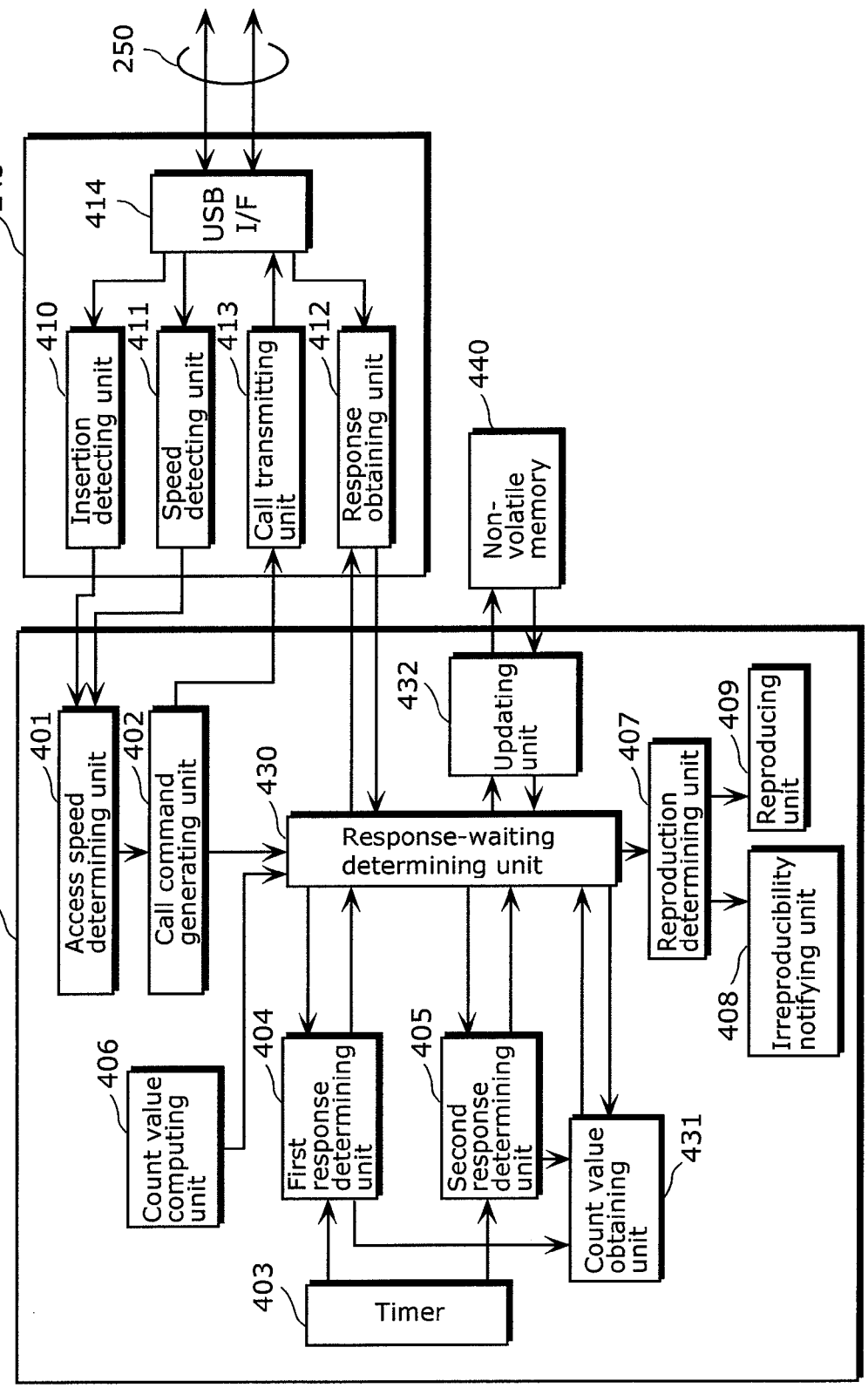
FIG. 8 is a block diagram showing a functional configuration of a reproduction device according to a fourth embodiment of the present invention.

FIG. 8 is a block diagram showing a functional configuration of the operation unit 242, the USB core unit 243, and its periphery circuit according to the fourth embodiment of the present invention. It should be noted that the same numerals are given to components which are the same as those in FIG. 3, and the components are not described in detail.

In addition to the configuration of the operation unit 242 shown by FIG. 3, the operation unit 242 shown by FIG. 8 further includes a count value obtaining unit 431 and an updating unit 432. Moreover, a function of a response-waiting determining unit 430 differs. Additionally, the reproduction device 200 further includes a non-volatile memory 440.

The non-volatile memory 440 is a non-volatile storing unit which stores the largest value of a response time of a USB device. For example, the non-volatile memory 440 is mounted on the same board as the semiconductor device 240.

In addition to the function of the response-waiting determining unit 415, the response-waiting determining unit 430 determines whether or not a response is to be waited for the second waiting time, based on the largest value of the response time stored in the non-volatile memory 440. Specifically, in the case where the largest value of the response time stored in the non-volatile memory 440 is larger than a predetermined value, the response-waiting determining unit 430 determines that the response is to be waited for the second waiting time, and in the case where the largest value of the response time stored in the non-volatile memory 440 is smaller than the predetermined value, the response-waiting determining unit 430 determines that the response is not to be waited for the second waiting time.

The count value obtaining unit 431 obtains a count value of the timer 403 when the response obtaining unit 412 obtains a response from the USB device 300 during the first waiting time or the second waiting time. In other words, the count value obtaining unit 431 obtains the count value corresponding to the response time of the USB device 300 to a call command.

In the case where the count value obtained by the count value obtaining unit 431 is larger than the largest value of the response time stored in the non-volatile memory 440, the updating unit 432 updates the largest value of the response time stored in the non-volatile memory 440 to the count value.

Furthermore, in the case where the response-waiting determining unit 430 determined that the response would not be waited for the second waiting time, the second response determining unit 405 does not wait for the response for the second waiting time. That is, in the case where the first response determining unit 404 determined that the response obtaining unit 412 had not obtained the response from the USB device 300 and the response-waiting determining unit 430 determined that the response would be waited, the second response determining unit 405 determines whether or not the response obtaining unit 412 obtained the response from the USB device 300 during the second waiting time counted by the timer 403.

Moreover, in the case where the first response determining unit 404 determined that the response obtaining unit 412 had not obtained the response from the USB device 300 and the response-waiting determining unit 430 determined that the response would not be waited, the irreproducibility notifying unit 408 notifies the system controller 210 that the data held in the USB device 300 cannot be reproduced.

Next, an operation of the reproduction device 200 according to the fourth embodiment of the present invention is described.

Figure 9:
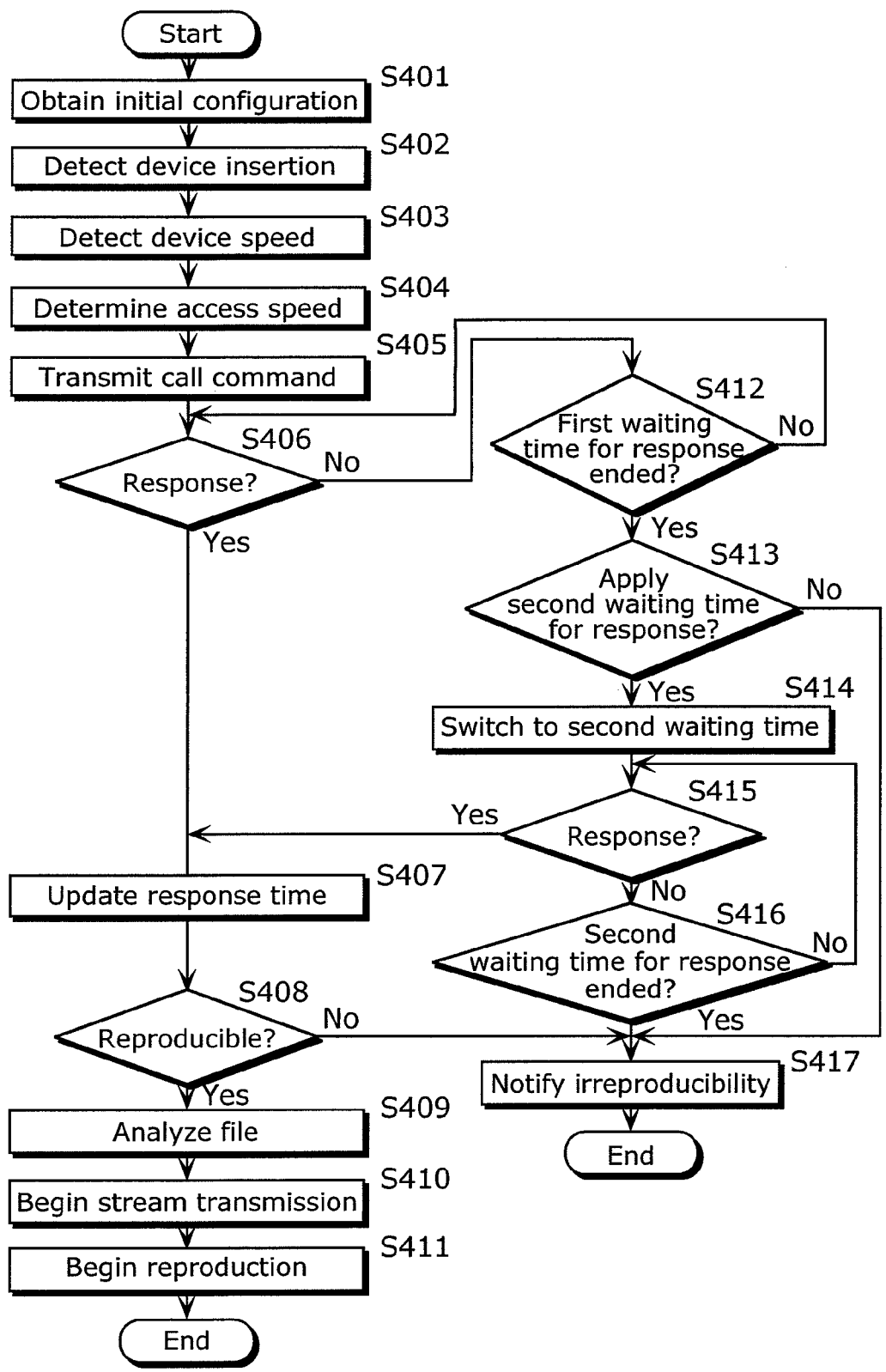
FIG. 9 is a flow chart showing a flow of the reproduction processing for data stored in a USB device by the reproduction device according to the fourth embodiment of the present invention.

FIG. 9 is a flow chart showing a flow of reproduction processing for music data stored in the USB device 300 by the reproduction device 200 according to the fourth embodiment of the present invention. The flow of the reproduction processing shown by FIG. 9 is the partially modified flow of the reproduction processing of the above mentioned third embodiment. The same elements of the flows are not described, and only different elements of the flows are described.

Compared with the flow of the reproduction processing shown by FIG. 7, a response time updating process (S407) is added to the flow of the reproduction processing shown by FIG. 9. Additionally, contents of an initial configuration obtaining process (S401) and a second waiting time for response application determining process (S412) differ.

As shown by FIG. 9, the response-waiting determining unit 430 obtains, as an initial configuration, the largest value of a response time of a USB device stored in the non-volatile memory 440 (S401). The reproduction device 200 determines whether the first waiting time or the second waiting time is to be applied, based on the obtained response time. Here, the largest value of the response time stored in the non-volatile memory 440 is the largest value of the response time of one or more USB devices that were connected to the reproduction device 200 before. Furthermore, the response time is a time from when the timer 403 begins to count the first waiting time till when the response from the USB device to a call command is made.

Processes S402 to S406 shown by FIG. 9 are the same as the processes S302 to S306 shown by FIG. 7, and are not described. Moreover, processes subsequent to S406 shown by FIG. 9 excluding a process S413, a process in the case of Yes in S406, and a process in the case of Yes in S415 are the same processes shown by FIG. 7, and are not described.

In the case where the first response time passed in S412 (Yes in S412), the response-waiting determining unit 430 determines whether or not the response is to be waited for the second waiting time in accordance with the response time obtained in S401 (S413). Specifically, in the case where the largest value of the response time obtained in S401 is larger than a predetermined value, the response-waiting determining unit 430 determines that the response is to be waited for the second waiting time, and in the case where the largest value of the response time obtained in S401 is smaller than the predetermined value, it determines that the response is not to be waited for the second waiting time.

Here, the predetermined value is, for example, a value smaller than the first waiting time. In other words, in the case where all of the response times of USB devices that were connected before is sufficiently smaller than the first waiting time (when the largest value of the response time is smaller than the predetermined value), the response-waiting determining unit 430 determines that the response is not to be waited for the second waiting time. That is, in the case where a user is using the reproduction device 200 in an environment where only a USB device having sufficiently fast response speed is connected to the reproduction device 200, the response is not to be waited for the second waiting time.

In the case where the response-waiting determining unit 430 determined that the response would be waited for the second waiting time (Yes in S413), the second response determining unit 405 switches from the first waiting time to the second waiting time by obtaining the second count value stored in the operation ROM unit 247 (S313).

Additionally, in the case where the response-waiting determining unit 430 determined that the response would not be waited for the second waiting time (No in S413), the irreproducibility notifying unit 408 notifies the system controller 210, through the I/O unit 241, that the data held in the USB device 300 cannot be reproduced (S417), and ends a reproduction operation.

On the other hand, in the case where there was the response from the USB device 300 during the first waiting time for response or the second waiting time for response (Yes in S406 and Yes in S415), that is, in the case where the first response determination result or the second response determination result is "response", the response-waiting determining unit 430 transmits a count value computation indication to the count value obtaining unit 431.

The count value obtaining unit 431 that received the count value computation indication obtains a time when there was the response from the USB device 300. Specifically, the count value obtaining unit 431 obtains, from the first response determining unit 404 or the second response determining unit 405, waiting time information which is a count value of the timer 403 when the response obtaining unit 412 obtained the response from the USB device 300. The count value obtaining unit 431 transmits, to the response-waiting determining unit 430, the obtained waiting time information as count value information.

The response-waiting determining unit 430 transmits, to the updating unit 432, the count value information and waiting time information update indication.

In the case where the count value (the count value information) obtained by the count value obtaining unit 431 is larger than the largest value of the response time obtained in S401, the updating unit 432 that received the waiting time information update indication updates the largest value of the response time stored in a waiting time holding region of the non-volatile memory 440 to the count value obtained by the count value obtaining unit 431 (S407). Here, a count value that is stored in the non-volatile memory 440 in the case where there was the response from the USB device 300 during the second waiting time for response (Yes in S415) is, for example, a value gained by adding the count value obtained by the count value obtaining unit 431 to a count value corresponding to the first waiting time. It should be noted the count value obtained by the count value obtaining unit 431 and information that indicates whether the count values is obtained during the first waiting time or the second waiting time may be stored in the non-volatile memory 440.

It should be noted that processes subsequent to updating the response time are the same as the processes subsequent to S307 shown by FIG. 7, and are not described.

As described above, the reproduction device according to the fourth embodiment of the present invention determines whether or not the second waiting time is to be applied in S413, based on the largest value of the response time of the USB devices that have ever been connected. Accordingly, it is possible to set the waiting time according to the status of use. For example, in the case where the largest value of the response time stored in the non-volatile memory 440 is small and the response times of the USB devices that have ever been connected are relatively short, the response is not to be waited for the second waiting time. In other words, an increase in an extra waiting time can be suppressed.

Further, the learning function which handles the response time of the USB device can be made available by updating, at any time, the largest value of the response time of the USB devices that have ever been connected.

It should be noted that although the largest value of the response time of the USB device is stored in the non-volatile memory 440 in the above description, it may be stored in the hard disk or the like included in the reproduction device 200.

Moreover, although the largest value of the response time of the USB device is stored in the non-volatile memory 440 in the above description, a result of determination may be stored in the non-volatile memory 440 by determining whether or not the response is to be waited for the second waiting time by comparing the largest value of the response time (the count value obtained by the count value obtaining unit 431) updated by the response-waiting determining unit 430 and the predetermined value.

In addition, although the updating unit 432 records a count value having the longest waiting time by comparing the count valued held in the non-volatile memory 440 and a new count value, the updating unit 432 may record a count value having the shortest waiting time. Furthermore, the non-volatile memory 400 may record plural representative count values, such as each access speed of the USB device 300.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention can be applied to a semiconductor device, a reproduction device, and a method for controlling the same, and particularly to stationary audio equipment which reproduces music data held in a connected USB device. Moreover, the present invention can be applied to a stationary device having a video reproduction function for a still picture, a moving picture, and so on, and to a stationary device having an audio-visual simultaneous reproduction function.

What is claimed is:

1. A method for controlling a reproduction device that reproduces data held in a USB device connected to a USB terminal, the method comprising:
   detecting that the USB device is connected to the USB terminal;
   transmitting a call to the USB device, when the connection of the USB device is detected;
   detecting, during a first waiting time, a response from the USB device to the transmitted call, the response including information indicating whether or not the USB device includes a data storage;
   detecting, during a second waiting time, a response from the USB device to the transmitted call, when the response from the USB device is not detected during the first waiting time, the second waiting time being different from the first waiting time, the response including information indicating whether or not the USB device includes a data storage;
   detecting, during a third waiting time, a response from the USB device to the transmitted call, when the response from the USB device is not detected during the second waiting time and
   reproducing the data held in the USB device, when the response from the USB device is detected during one of the first waiting time, the second waiting time, and the third waiting time, and it is determined, based on the response, that the USB device includes the data storage,
   wherein the detecting of the response during the first waiting time includes:
      obtaining a first count value held in a storage included in the reproduction device; and
      counting the first waiting time by counting the first count value obtained from the storage,
   the detecting of the response during the second waiting time includes:
      obtaining a second count value held in the storage;
      computing a third count value by performing an arithmetic operation using the first count value and the second count value; and
      counting the second waiting time by counting the computed third count value, the detecting of the response during the third waiting time includes:
      computing a fourth count value by performing an arithmetic operation using at least two of the first count value, the second count value, and the third count value; and
      counting the third waiting time by counting the computed fourth count value.

2. The method for controlling the reproduction device according to claim 1,
   wherein, during the first waiting time, the response from the USB device to the transmitted call is detected at predetermined intervals, and
   during the second waiting time, the response from the USB device to the transmitted call is detected at the predetermined intervals.

3. The method for controlling the reproduction device according to claim 1,
   wherein the first waiting time is shorter than the second waiting time, and
   the computing the third count value adds the first count value and the second count value obtained from the storage.

4. The method for controlling the reproduction device according to claim 1, further comprising:
   obtaining a parameter which is set outside of the reproduction device;
   determining whether or not the detecting of the response during the second waiting time is to be performed according to the obtained parameter; and
   notifying, to the outside of the reproduction device, that the data held in the USB device cannot be reproduced, when the response from the USB device is not detected during the first waiting time and it is determined that the detecting of the response during the second waiting time is not to be performed,
   wherein, the response from the USB device to the transmitted call is detected during the second waiting time, when the response from the USB device is not detected during the first waiting time and it is determined that the detecting of the response during the second waiting time is to be performed.

5. The method for controlling the reproduction device according to claim 1, further comprising:
   determining whether or not the reproduction device can reproduce the data stored in the USB device; and
   notifying, to the outside of the reproduction device, that the data held in the USB device cannot be reproduced, when it is determined that the data cannot be reproduced.

6. A method for controlling a reproduction device that reproduces data held in a USB device connected to a USB terminal, the method comprising:

detecting that the USB device is connected to the USB terminal;

transmitting a call to the USB device, when the connection of the USB device is detected;

detecting, during a first waiting time, a response from the USB device to the transmitted call, the response including information indicating whether or not the USB device includes a data storage;

detecting, during a second waiting time, a response from the USB device to the transmitted call, when the response from the USB device is not detected during the first waiting time, the second waiting time being different from the first waiting time, the response including information indicating whether or not the USB device includes a data storage; and reproducing the data held in the USB device, when the response from the USB device is detected during one of the first waiting time and the second waiting time, and it is determined, based on the response, that the USB device includes the data storage;

obtaining a largest value of response time of the USB device, the largest value being stored in a non-volatile storage included in the reproduction device;

determining that the detecting of the response during the second waiting time is to be performed when the largest value obtained from the non-volatile storage is larger than a predetermined value, and that the detecting of the response during the second waiting time is not to be performed when the largest value obtained from the non-volatile storage is smaller than the predetermined value;

notifying, to the outside of the reproduction device, that the data held in the USB device cannot be reproduced, when the response from the USB device is not detected during the first waiting time and it is determined that the detecting of the response during the second waiting time is not to be performed;

obtaining a time at which the response from the USB device is received, when the response from the USB device is detected during one of the first waiting time and the second waiting time; and updating the largest value stored in the non-volatile storage to the obtained time, when the obtained time is larger than the largest value stored in the non-volatile storage, wherein, the response from the USB device to the transmitted call is detected during the second waiting time, when the response from the USB device is not detected during the first waiting time and it is determined that the detecting of the response during the second waiting time is to be performed.

7. A semiconductor device that is used in a reproduction device, and that reproduces data held in a USB device connected to a USB terminal included in the reproduction device, said semiconductor device comprising:

a connection detector operable to detect that the USB device is connected to the USB terminal;

a call transmitter operable to transmit a call to the USB device, when the connection of the USB device is detected by said connection detector;

a response obtainer operable to obtain a response from the USB device to the call transmitted by said call transmitter, the response including information indicating whether or not the USB device includes a data storage;

a counter operable to count a first waiting time, a second waiting time, which is different from the first waiting time, and a third waiting time;

a first determiner operable to determine whether or not said response obtainer obtains the response from the USB device during the first waiting time counted by said counter;

a second determiner operable to determine whether or not said response obtainer obtains the response from the USB device during the second waiting time counted by said counter, when said first determiner determines that said response obtainer does not obtain the response from the USB device;

a third determiner operable to determine whether or not said response obtainer obtains the response from the USB device during the third waiting time counted by said counter, when said second determiner determines that said response obtainer does not obtain the response from the USB device;

a reproducer operable to reproduce the data held in the USB device, when one of said first determiner, said second determiner, and said third determiner determines that said response obtainer obtains the response from the USB device and it is determined, based on the response, that the USB device includes the data storage;

a count value storage operable to store a first count value and a second count value; and a count value calculator operable to calculate at least one third count value by performing an arithmetic operation using the first count value and the second count value stored in said count value storage, wherein said counter is operable to count the first waiting time, the second waiting time., and the third waiting time by counting one of the first count value stored in said count value storage, the second waiting time stored in said count value storage, and the at least one third count value calculated by said count value calculator.

8. The semiconductor device according to claim 7, wherein said first determiner is operable to determine that said response obtainer obtains the response from the USB device without waiting for an elapse of the first waiting time, when said response obtainer obtains the response from the USB device, and said second determiner is operable to determine that said response obtainer obtains the response from the USB device without waiting for an elapse of the second waiting time, when said response obtainer obtains the response from the USB device.

9. The semiconductor device according to claim 7, wherein the first waiting time is shorter than the second waiting time.

10. The semiconductor device according to claim 7, further comprising:

a parameter obtainer operable to obtain a parameter that is set outside of the semiconductor device;

a response-waiting determiner operable to determine whether or not to wait for the response during the second waiting time according to the parameter obtained by said parameter obtainer; and a notifier operable to notify, to the outside of the semiconductor device, that the data held in the USB device cannot be reproduced, when said first determiner determines that said response obtainer does not obtain the response from the USB device and said response-waiting determiner determines not to wait for the response during the second waiting time, wherein said second determiner is operable to determine whether or not said response obtainer obtains the response from the USB device during the second waiting time counted by said counter, when said first determiner determines that said response obtainer does not obtain the response from the USB device and said response-waiting determiner determines to wait for the response during the second waiting time.

11. The semiconductor device according to claim 7, further comprising:
   a reproduction determiner operable to determine whether or not said reproducer can reproduce the data held in the USB device; and
   a notifier operable to notify, to the outside of the semiconductor device, that the data held in the USB device cannot be reproduced, when said reproduction determiner determines that the data cannot be reproduced.

12. A semiconductor device that is used in a reproduction device, and that reproduces data held in a USB device connected to a USB terminal included in the reproduction device, said semiconductor device comprising:
   a connection detector operable to detect that the USB device is connected to the USB terminal;
   a call transmitter operable to transmit a call to the USB device, when the connection of the USB device is detected by said connection detector;
   a response obtainer operable to obtain a response from the USB device to the call transmitted by said call transmitter, the response including information indicating whether or not the USB device includes a data storage;
   a counter operable to count a first waiting time and a second waiting time, which is different from the first waiting time;
   a first determiner operable to determine whether or not said response obtainer obtains the response from the USB device during the first waiting time counted by said counter;
   a second determiner operable to determine whether or not said response obtainer obtains the response from the USB device during the second waiting time counted by said counter, when said first determiner determines that said response obtainer does not obtain the response from the USB device;
   a reproducer operable to reproduce the data held in the USB device, when one of said first determiner and said second determiner determines that said response obtainer obtains the response from the USB device and it is determined, based on the response, that the USB device includes the data storage;
   a non-volatile storage operable to store a largest value of response time of the USB device;
   a response-waiting determiner operable to determine to wait for the response during the second waiting time, when the largest value stored in said non-volatile storage is larger than a predetermined value, and not to wait for the response during the second waiting time, when the largest value stored in said non-volatile storage is smaller than the predetermined value;
   a notifier operable to notify, to the outside of the semiconductor device, that the data held in the USB device cannot be reproduced, when said first determiner determines that said response obtainer does not obtain the response from the USB device and said response-waiting determiner determines not to wait for the response during the second waiting time;
   a count value obtainer operable to obtain a count value of said counter when said response obtainer obtains the response from the USB device; and
   an updater operable to update the largest value stored in said non-volatile storage to the count value, when the count value obtained by said count value obtainer is larger than the largest value stored in said non-volatile storage,
   wherein said second determiner is operable to determine whether or not said response obtainer obtains the response from the USB device during the second waiting time counted by said counter, when said first determiner determines that said response obtainer does not obtain the response from the USB device and said response-waiting determiner determines to wait for the response during the second waiting time.

13. A reproduction device that includes a USB terminal and reproduces data held in a USB device connected to the USB terminal, said device comprising:
   a connection detector operable to detect that the USB device is connected to the USB terminal;
   a call transmitter operable to transmit a call to the USB device, when the connection of the USB device is detected by said connection detector;
   a response obtainer operable to obtain a response from the USB device to the call transmitted by said call transmitter, the response including information indicating whether or not the USB device includes a data storage;
   a counter operable to count a first waiting time, and a second waiting time, which is different from the first waiting time, and a third waiting time;
   a first determiner operable to determine whether or not said response obtainer obtains the response from the USB device during the first waiting time counted by said counter;
   a second determiner operable to determine whether or not said response obtainer obtains the response from the USB device during the second waiting time counted by said counter, when said first determiner determines that said response obtainer does not obtain the response from the USB device;
   a third determiner operable to determine whether or not said response obtainer obtains the response from the USB device during the third waiting time counted by said counter, when said second determiner determines that said response obtainer does not obtain the response from the USB device;
   a reproducer operable to reproduce the data held in the USB device, when one of said first determiner, said second determiner, and said third determiner determines that said response obtainer obtains the response from the USB device and it is determined, based on the response, that the USB device includes the data storage;
   a count value storage operable to store a first count value and a second count value; and
   a count value calculator operable to calculate at least one third count value by performing an arithmetic operation using the first count value and the second count value stored in said count value storage,
   wherein said counter is operable to count the first waiting time, the second waiting time, and the third waiting time by counting one of the first count value stored in said count value storage, the second waiting time stored in said count value storage, and the at least one third count value calculated by said count value calculator.

14. A tangible computer-readable recording medium storing a program for controlling a reproduction device that reproduces data held in a USB device connected to a USB terminal, the program causing a computer to execute:
   detecting that the USB device is connected to the USB terminal;

transmitting a call to the USB device, when the connection of the USB device is detected;

detecting, during a first waiting time, a response from the USB device to the transmitted call, the response including information indicating whether or not the USB device includes a data storage;

detecting, during a second waiting time, a response from the USB device to the transmitted call, when the response from the USB device is not detected during the first waiting time, the second waiting time being different from the first waiting time, the response including information indicating whether or not the USB device includes the data storage; and detecting, during a third waiting time, a response from the USB device to the transmitted call, when the response from the USB device is not detected during the second waiting time, reproducing the data held in the USB device, when the response from the USB device is detected during one of the first waiting time, the second waiting time and the third waiting time, and it is determined, based on the response, that the USB device includes the data storage, wherein the detecting of the response during the first waiting time includes:
  obtaining a first count value held in a storage included in the reproduction device; and
  counting the first waiting time by counting the first count value obtained from the storage, the detecting of the response during the second waiting time includes:
  obtaining a second count value held in the storage;
  computing a third count value by performing an arithmetic operation using the first count value and the second count value; and
  counting the second waiting time by counting the computed third count value, the detecting of the response during the third waiting time includes:
  computing a fourth count value by performing an arithmetic operation using at least two of the first count value, the second count value, and the third count value; and
  counting the third waiting time by counting the computed fourth count value.

* * * * *